(12) United States Patent
Nordt et al.

(10) Patent No.: US 6,295,794 B1
(45) Date of Patent: Oct. 2, 2001

(54) JOINT COMPOUND INCLUDING RECYCLED CONSTITUENTS AND METHOD AND SYSTEM FOR MAKING THE SAME

(75) Inventors: Frank Juergen Nordt, Portland; Jason A. Everett, Wilsonville; Duane L. Whipple, Silverton; David E. Spring, Keizer, all of OR (US)

(73) Assignee: Universal Forest Products, Inc., Grand Rapids, MI (US)

( * ) Notice: Subject to any disclaimer, the term of this patent is extended or adjusted under 35 U.S.C. 154(b) by 0 days.

(21) Appl. No.: 09/227,788

(22) Filed: Jan. 8, 1999

Related U.S. Application Data
(60) Provisional application No. 60/071,092, filed on Jan. 9, 1998.

(51) Int. Cl.[7] .............................. B65B 3/04; B32B 35/00
(52) U.S. Cl. .......................... 53/467; 106/783; 106/786; 241/14; 241/27; 141/94; 156/94
(58) Field of Search .................... 53/131.1, 411, 53/416, 452, 467; 106/772, 773, 783, 784, 785, 786; 241/14, 24.21, 79, 79.2, 27; 141/94; 156/94, 344, 584

(56) References Cited

U.S. PATENT DOCUMENTS

| | | |
|---|---|---|
| 898,451 | 9/1908 | Eastwick . |
| 1,937,292 | 11/1933 | Moore . |
| 3,658,564 | 4/1972 | Gerow et al. . |
| 3,682,670 | 8/1972 | Rustan . |
| 3,782,986 | 1/1974 | Vincent . |
| 3,841,886 | 10/1974 | Burr . |
| 4,016,240 | 4/1977 | Hinsche et al. . |
| 4,049,866 * | 9/1977 | Lane et al. ............................ 106/784 |
| 4,287,103 * | 9/1981 | Francis et al. ........................ 106/782 |
| 4,443,261 | 4/1984 | Nordqvist . |
| 4,454,267 | 6/1984 | Williams . |
| 4,523,954 | 6/1985 | Pichat et al. . |
| 4,657,594 | 4/1987 | Struss . |
| 4,686,253 | 8/1987 | Struss et al. . |
| 5,079,042 | 1/1992 | Frings . |
| 5,100,063 | 3/1992 | Bauer . |
| 5,102,462 | 4/1992 | Podlas . |
| 5,155,959 | 10/1992 | Richards et al. . |
| 5,171,366 | 12/1992 | Richards et al. . |
| 5,183,213 | 2/1993 | Knez, Jr. . |
| 5,230,200 | 7/1993 | Douglas et al. . |
| 5,238,195 | 8/1993 | Knez, Jr. . |
| 5,240,500 | 8/1993 | Retti . |
| 5,277,712 | 1/1994 | McInnis . |
| 5,304,276 * | 4/1994 | MacLeod et al. .................... 156/344 |
| 5,323,588 * | 6/1994 | Zak et al. ............................ 53/131.1 |
| 5,324,501 | 6/1994 | Koehnk et al. . |
| 5,413,284 | 5/1995 | Hirz et al. . |
| 5,433,388 | 7/1995 | Hirz et al. . |
| 5,534,059 | 7/1996 | Immordino, Jr. . |
| 5,577,672 | 11/1996 | Holmes . |
| 5,593,096 | 1/1997 | Harker et al. . |
| 5,630,556 | 5/1997 | Chrestenson . |
| 5,653,797 | 8/1997 | Patel . |
| 5,746,822 * | 5/1998 | Espinoza et al. ..................... 106/785 |

* cited by examiner

*Primary Examiner*—Peter Vo
*Assistant Examiner*—Louis K. Huynh
(74) *Attorney, Agent, or Firm*—Rader, Fishman, Grauer & McGarry an Office of Rader, Fishman & Grauer PLLC

(57) ABSTRACT

A composition of matter for joint or texture compound used in wallboard applications which incorporates an ingredient which has been reclaimed from waste wallboard panel. A method and system for reconstituting the waste wallboard into the joint compound is also provided. Waste wallboard is thereby recycled so that the waste wallboard does not need to be disposed in a landfill.

47 Claims, 10 Drawing Sheets

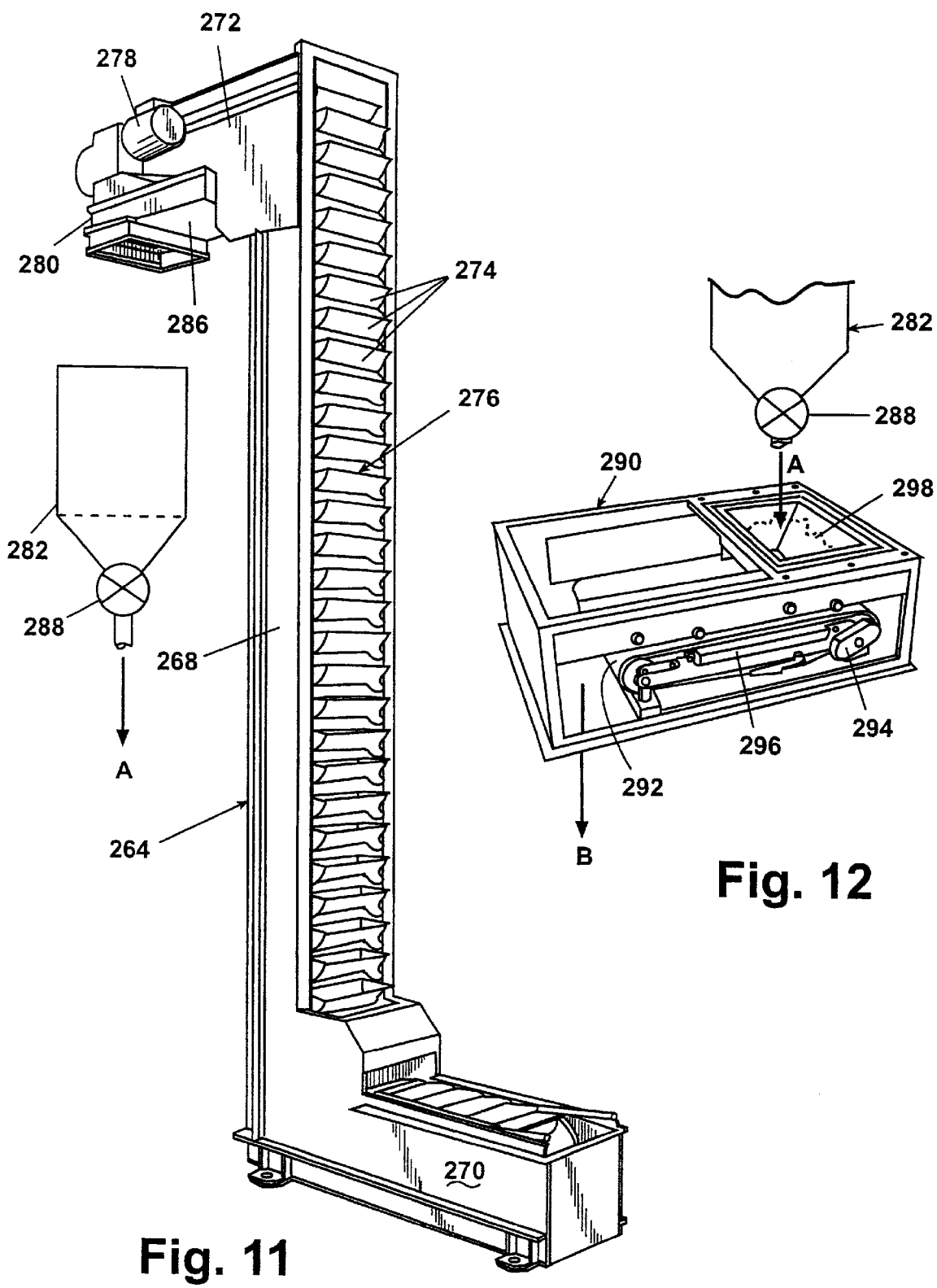

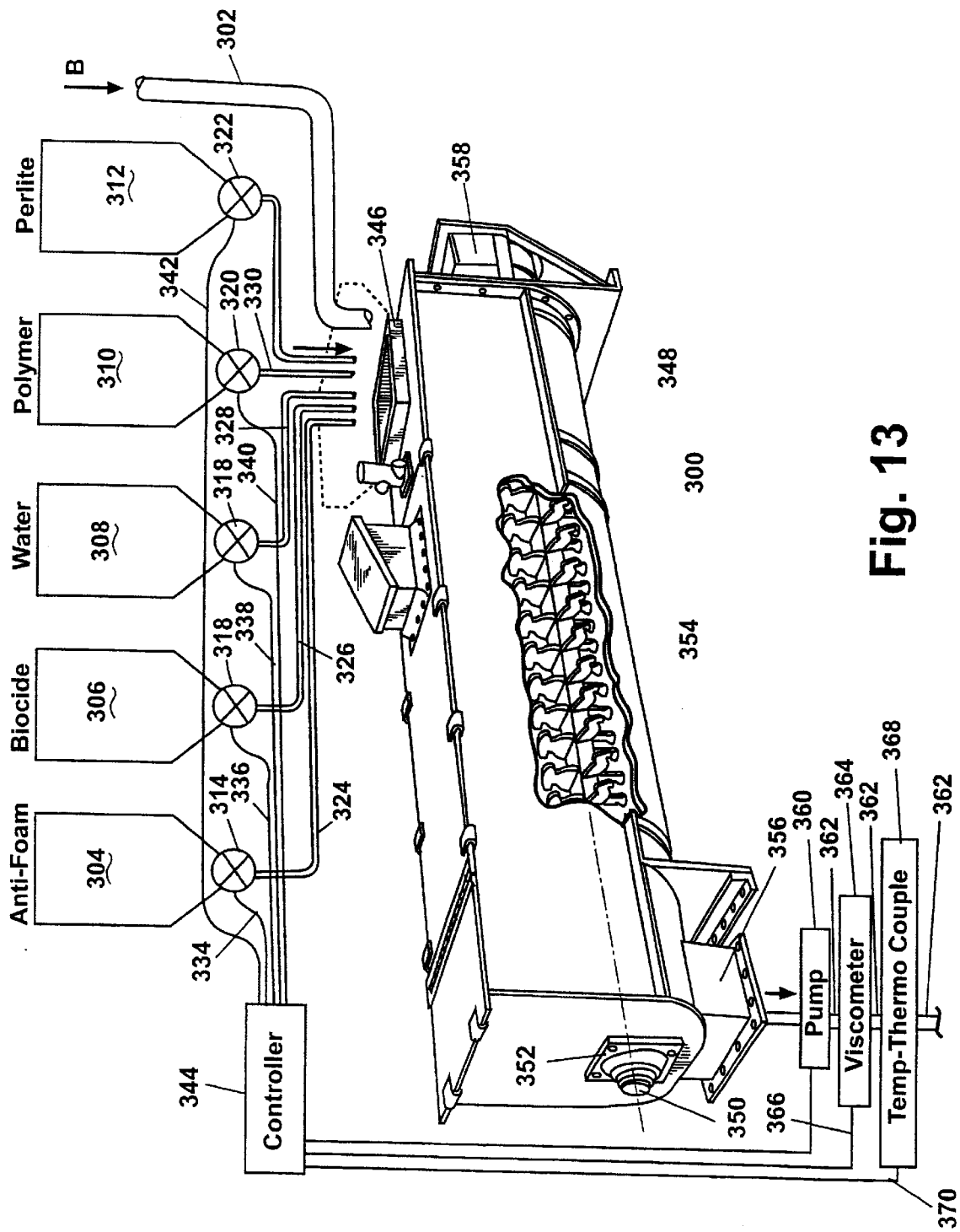

JOINT COMPOUND INCLUDING RECYCLED CONSTITUENTS AND METHOD AND SYSTEM FOR MAKING THE SAME

CROSS-REFERENCE TO RELATED APPLICATIONS

This application claims priority on U.S. patent application Ser. No. 60/071,092, filed Jan. 9, 1998.

BACKGROUND OF THE INVENTION

1. Field of the Invention

The invention relates to a composition for joint compound including recycled wallboard constituents and a method and system for making the same.

2. Description of the Related Art

Interior walls of commercial and residential dwellings, including manufactured housing, are typically made by mounting wallboard panels onto an existing stud structure with conventional fasteners such as nails or drywall screws. A pair of abutting panels often has an uneven seam which is filled with "joint compound," a filler which dries and hardens. The hardened joint compound is typically sanded to create a smooth and aesthetically pleasing wall surface which completes the drywall process. Joint compounds can be classified into two basic formulations, i.e., "setting" and "drying." The drying type of joint compound is often formulated as a ready-mixed joint compound, while the setting type is provided as a powder which typically requires the addition of water immediately prior to application.

The setting and drying types of joint compounds have varying characteristics. The drying type is often a combination based on limestone ($CaCO_3$), gypsum (hemihydrate) ($CaSO_4 * 1/2H_2O$) and/or gypsum (dihydrate) ($CaSO_4 * 2H_2O$) while the setting type is often based on gypsum (hemihydrate) ($CaSO_4 * 1/2H_2O$). After application into and over a seam between a pair of adjacent wallboard panels, the drying type joint compound dries by contact with air via the ensuent evaporation of water while the setting type reacts chemically to harden within a predetermined time.

Manufacture of either type of joint compound is costly. The basic ingredients of joint compounds are expensive process. In addition, government regulations often require that various ingredients such as asbestos, mica and talc be added or removed from these formulations to increase their safety.

In construction today, about one and one half pounds of wallboard waste is generated per square foot of a constructed dwelling. In the case of manufactured housing, this number may increase to two or three pounds of wallboard waste per square foot. This waste is costly due to the cost of materials as well as the cost required to dispose of the waste wallboard.

The latter is a significant problem. After disposal, the wallboard may degrade under certain conditions to form dangerous by-products, such as hydrogen sulfide gas. In addition, the sheer volume of wallboard waste as well as the dangerous by-products formed during its degradation has led many municipal landfills to prohibit dumping of wallboard waste and to demand recycling programs.

SUMMARY OF THE INVENTION

The invention, therefore, relates to a joint compound composition which includes recycled wallboard constituents and a method and system for making the same. Waste wallboard is recycled according to the invention so as to obviate the need for its disposal in a landfill. In addition, because wallboard and joint compound share at least one common ingredient, the wallboard can be reconstituted into a joint compound formulation which, in turn, obviates the need to purchase the common ingredient.

In one respect, the invention relates to an improved joint compound formulation suitable for insertion into and over a seam between adjacent wallboard panels comprising a binder, a preservative, a rheological additive, a surfactant and a filler, wherein the improvement lies within the fact that at least a portion of the filler comprises a granular material reclaimed from waste wallboard panels.

The granular material can comprise gypsum reclaimed from waste wallboard panels. At least a portion of the filler can be present in an amount of about 40 to about 90 percent by weight. The granular material can further comprise trace elements of residual paper fiber. The binder preferably comprises a material selected from the group consisting of polyvinyl alcohol, polyvinyl acetate, starch, glue, adhesive, casein, and protein, either alone or in combination. The binder can be present in an amount of about 1 to about 8 percent by weight. The preservative can be a material selected from the group consisting of an antifoaming agent, a biocide, and a fungicide, either alone or in combination. The preservative can be present in an amount of about 0.01 to about 1 percent by weight. The rheological additive can be a material selected from the group consisting of methylcellulose, hectorite clay, attapulgite clay combined with water, either alone or in combination. The rheological additive can be present in an amount of about 0.01 to 3 percent by weight. The surfactant can be a material selected from the group consisting of non-ionic, cationic or anionic surfactants. The remainder of the filler other than that reclaimed from waste wallboard panel can comprise a compound selected from the group consisting of virgin gypsum, lime, limestone, talc, mica, perlite, and wollastonite, either alone or in combination. The remainder of the filler other than that reclaimed from waste wallboard panel can be present in the amount of about 2 to about 10 percent by weight.

In another aspect, the invention relates to a method for producing a joint compound composition suitable for insertion into and over a seam between adjacent wallboard panels comprising the steps of reclaiming a filler constituent from waste wallboard panel, and mixing the filler constituent with at least one of a binder, preservative, a surfactant and a rheological additive.

The method can also further comprise any or all of the steps of separating a paper backing from the waste wallboard panel; baling the removed paper backing into a compressed package; reclaiming a filler constituent from waste wallboard panel which further comprises the steps of providing a metal detector; actuating the metal detector to sense residual metal components remaining in the waste wallboard panel; and alerting a user of the presence of metal components remaining in the waste wallboard panel; providing at least one secondary storage facility for intermediate storage of waste wallboard material prior to the step of mixing the waste wallboard with other ingredients; grinding the waste wallboard panel to a predetermined mesh size; providing a mill for grinding the waste wallboard to the predetermined mesh size; periodically purging the contents of the mill to reduce the concentration of any trace contaminants therein; collecting the ground particulate waste wallboard material from the mill in at least one secondary storage facility; providing a mixing unit for mixing the particulate waste wallboard material with at least one of the binder, preservative, surfactant and rheological additive; fluidly interconnecting the mixing unit with a supply of the binder, the preservative, surfactant and/or the rheological additive; metering a predetermined amount of the particular waste wallboard material the binder, the preservative surfactact and/or the rheological additive into the mixing unit; actuating the mixing unit to mix the contents of the mixing unit into a joint compound mixture; providing the mixing unit with at least one shaft having radially-extending blades thereon; providing an outlet port on the mixing unit; providing a packaging system downstream of the mixing unit; fluidly interconnecting the outlet port of the mixing unit to the packaging system; providing a pump intermediate the outlet port of the mixing unit and the packaging system for controlling the flow of the joint compound mixture from the mixing unit to the packaging system; providing a viscometer fluidly interconnected between the mixing unit and the packaging system for indicating the viscosity of the joint compound mixture; alerting a user when the viscosity of the joint compound mixture reaches a predetermined value; providing a thermometer fluidly interconnected between the mixing unit and the packaging system for indicating the temperature of the joint compound mixture; alerting a user when the temperature of the joint compound mixture reaches a predetermined value; wherein the packaging system comprises a carton feeding apparatus and a filling station interconnected to the mixing unit; positioning a carton adjacent to the filling station; actuating the filling station to dispense a predetermined volume of joint compound mixture into the carton; and closing and sealing the carton containing the predetermined volume of joint compound.

In an additional aspect, the invention also relates to a system for making joint compound having at least one constituent reclaimed from waste wallboard material comprising a constituent material having an attached paper backing. The system preferably comprises a separator having an inlet port for receipt of waste wallboard material, an outlet port, and a separating mechanism disposed in the separator intermediate between the inlet and outlet ports for separating the paper backing from the constituent material and delivering the constituent material to the outlet port. The system also preferably comprises a mixing unit having an inlet port, an outlet port and a mixing apparatus disposed therebetween adapted to mix ingredients delivered to the mixing unit and delivering said mixture to the outlet port thereof, the inlet port of the mixing unit interconnected with the first outlet port of the separator for receipt of the constituent material therefrom. The system further comprises respective storage facilities of at least one of a binder, preservative, surfactant and a rheological additive operably interconnected with the mixing unit for selective delivery of the at least one of the binder, preservative and the rheological additive thereto. Upon receipt of the constituent material by the mixing unit from the separator and delivery of a predetermined volume of the at least one of the binder, preservative, surfactant and rheological additive to the mixing unit, actuation of the mixing apparatus mixes the ingredients therein into a joint compound mixture which can be obtained from the outlet port of the mixing unit.

The system can also comprise several additional features. A hoist can be located adjacent to the separator moveable between a first position remote from the separator wherein the hoist can receive a volume of waste wallboard material and a second position interconnected with the inlet port of the separator whereby the hoist facilitates delivery of the waste wallboard material to the separator. A metal detector can be located upstream from the inlet of the separator which is adapted to provide an alert signal to a user upon the detection of a predetermined level of residual metal in the waste wallboard material being delivered to the separator. A first conveyor can be disposed between the second end of the hoist and the inlet port of the separator. The first conveyor can comprise a vibratory conveyor for urging waste wallboard toward the inlet port of the separator by way of directional vibration imparted to the waste wallboard. The metal detector can be mounted to the first conveyor.

The separator can comprise a first pair of counterrotating rollers located adjacent to the inlet port of the separator. The first pair of counterrotating rollers each preferably have an outer surface provided with radially-extending blades thereon. The separator can further comprise a second pair of counterrotating rollers disposed intermediate between the first pair of counterrotating rollers and the outlet port.

A baling system can be provided which has an inlet port and an outlet port, the inlet port of the baling system can be interconnected with the outlet port of the separator whereby the paper backing removed by the separator is delivered to the baling system. The baling system can have a housing provided with an extendible piston and a chamber defines a collapsible chamber wherein, upon receipt of a predetermined amount of removed paper backing in the chamber, the piston can be extended to compress the paper backing into a bale for disposal or recycling.

A second conveyor is preferably provided between the outlet port of the separator and the baling system, the second conveyor can have a first driven member for urging the constituent toward the mixing unit and a second driven member for urging the removed paper backing toward the baling system.

A secondary storage facility can be fluidly interconnected between the outlet port of the separator and the inlet port of the mixing unit whereby the constituent material can be temporarily stored to allow the separator and mixing unit to operate independently of one another.

A mill can be provided which has an inlet and an outlet, the inlet of the mill can be interconnected with the outlet port of the separator by way of the secondary storage facility, and the outlet of the mill can be interconnected with the inlet port of the mixing unit whereby the constituent material received by the mill is ground to a predetermined mesh size. A feeder can be provided which has an inlet and an outlet, the inlet of the feeder can be interconnected with the outlet of the mill, the outlet of the feeder can be interconnected with the mixing unit whereby the feeder meters the amount of the constituent exiting the mill into the mixing unit. Another secondary storage facility can be disposed between the mill and the mixing unit for temporarily storing the constituent so that the separator and mill can be deactivated without interrupting the operation of the mixing unit.

The respective storage facilities of at least one of a binder, preservative, surfactant and a rheological additive can further comprise storage facilities containing a binder, preservative, surfactant and a rheological additive operably interconnected with the mixing unit for selective delivery of the binder, preservative, surfactant and the rheological additive thereto. The mixing unit can further comprise at least one shaft having radially-extending blades thereon.

A packaging system can be located downstream of the mixing unit wherein the outlet port of the mixing unit is fluidly interconnected to the packaging system. A pump can be located intermediate the outlet port of the mixing unit and the packaging system for controlling the flow of the joint compound mixture from the mixing unit to the packaging system. A viscometer can be fluidly interconnected between the mixing unit and the packaging system for indicating the viscosity of the joint compound mixture. A thermometer can be fluidly interconnected between the mixing unit and the packaging system for indicating the temperature of the joint compound mixture.

The packaging system can comprise a carton feeding apparatus and a filling station interconnected to the mixing unit. A carton can be provided wherein the filling station is actuated to dispense a predetermined volume of joint compound mixture into the carton. The carton is preferably closed and sealed to contain the predetermined volume of joint compound.

Other objects, features, and advantages of the invention will be apparent from the ensuing description in conjunction with the accompanying drawings.

BRIEF DESCRIPTION OF THE DRAWINGS

The invention will now be described with reference to the following drawings in which similar features have been consistently identified with the same reference numerals in the various figures and wherein:

FIG. 11 is a perspective view of an example of a conveyor employed in the system of FIG. 1 which is adapted to transport material exiting the milling and collection apparatus of FIG. 10 to a bin located adjacent thereto and shown in schematic form;

FIG. 12 is a perspective view of an example of a feeding apparatus shown in the system of FIG. 1 located adjacent to an outlet of the bin of FIG. 11 for transporting collected wallboard waste exiting the conveyor of FIG. 11 and transporting discrete weight portions of the wallboard waste to a blending unit as illustrated in FIG. 13;

FIG. 13 is a perspective view of an example of the blending unit shown in the system in FIG. 1 for mixing several ingredients in storage facilities adjacent thereto (shown in schematic form) to form a joint compound mixture including wallboard waste according to invention.

DETAILED DESCRIPTION OF THE PREFERRED EMBODIMENTS

Figure 1:
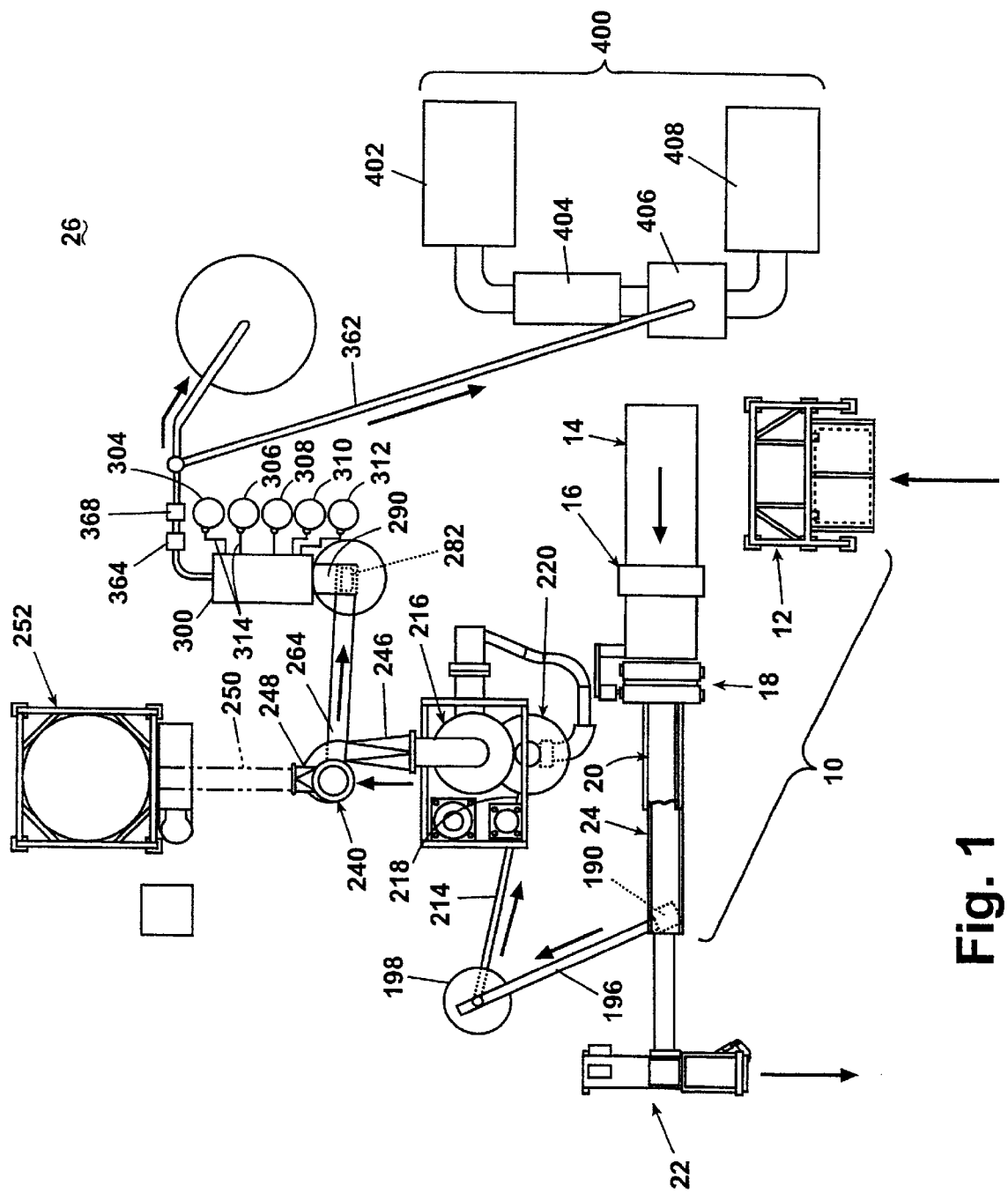
FIG. 1 is a schematic top plan view of the system for manufacturing joint compound according to the invention including the step of recycling waste wallboard.

The central characteristics of the wallboard finishing system of the present invention is the use of recycled gypsum wallboard as a filler to provide a reduction in cost of the manufacturing process as well as relief from the high cost of disposal of wallboard waste. It will be understood that the wallboard used in these applications is generally provided in industry-standard dimensions, such as in four-foot by eight-foot panels, and comprises a rigid laminar gypsum sheet to which a paper backing material is attached. The paper backing is typically mounted on the gypsum as the gypsum sets on the paper backing which is typically aided by the inclusion of an adhesive compound. The joint compound composition according to this invention generally comprises a binder, a preservative, a surfactant, a rheological additive, and a filler.

The binder is a substance added which causes the joint compound to dry and harden without cracking when exposed to air, heat, or any other desired catalyst and can be selected from any of the many suitable materials available which would be well known to a person skilled in the art. Such suitable materials include, but are not limited to, polyvinyl acetate, polyvinyl alcohol, propylene glycol, starches, adhesives, casein or other proteins or combinations thereof. It has been found that an emulsion sold under the product name "Airflex 526BP emulsion" available from Air Products and Chemicals, provides excellent results for the polyvinyl acetate. The polyvinyl alcohol is also available from Air Products and Chemicals under the product name "Airvol 523S," although other equivalent compositions can be used without departing from the scope of this invention. The propylene glycol is a commodity chemical which is readily available from several commercial sources.

The preservative is a substance added to the joint compound to prevent spoilage of the joint compound during lengthy storage thereof and can be selected from any of the many suitable materials available which would be well known to a person skilled in the art. Such suitable materials include, but are not limited to, an antifoaming agent, a biocide and a fungicide, either alone or in combination.

The surfactant is a substance added to the joint compound to aid in the wetting and dispersion of the filler and/or other components of the formulation and can be selected from any one of a group of non-ionic, cationic or anionic surfactants, but especially t-octylphenoxypolyethoxyethanol. Under certain circumstances a cationic or an anionic surfactant may also be used to advantage.

The rheological additive is a substance added to improve the flow characteristics of the joint compound as it is spread over a wall surface and can be selected from any of the many suitable materials available which would be well known to a person skilled in the art. Such suitable materials include, but are not limited to methylcellulose and/or derivatives thereof, hectorite clay, attapulgite clay or water, either alone or in combination. Methylethylcellulose and/or derivatives thereof are available from Dow Chemical Company.

The filler is a substance added to increase the volume of the mixture without affecting the characteristics or properties thereof and preferably comprises, at least in part, a constituent reclaimed from waste wallboard material. The constituent generally comprises ground waste wallboard material which includes a large percentage of gypsum and trace elements of residual paper fibers remaining when a paper backing is removed from the wallboard material. The filler can be supplemented with other fillers known to a person skilled in the art such as virgin gypsum, lime, limestone, talc, mica, perlite or synthetic equivalents thereof and wollastonite, either alone or in combination. A synthetic equivalent of perlite is available from Silbrico Corporation, 6300 River Road, Hodgkins, Ill., 60525 -4257, and is available in a variety of satisfactory grades for the purposes of supplementing the waste wallboard material.

During the process for recycling gypsum from wallboard waste described herein, the paper backing is removed from the gypsum wallboard. During this removal, some amount of paper and paper fibers may be included in the gypsum reclaimed from the waste wallboard. Of course, it is desirable to remove as much paper as possible from the reclaimed gypsum before mixing with the remaining components of the composition. It has been found that the residual paper content in the composition should be less than a predetermined percentage by weight, and preferably between 0 and 10 percent by weight. If the residual paper content of the composition is higher than the predetermined percentage by weight, then the joint compound does not dry properly and often fails once set, requiring the wall to be reset or repaired.

The above ingredients can be mixed in wide ranges of proportions to provide a suitable joint compound which includes recycled gypsum material. For example, it has been found that the concentration of filler such as reclaimed gypsum can vary from 40% to 90%, the concentration of other fillers such as perlite or synthetic equivalent thereof can vary between 1% to 14%, the concentration of the binder such as polyvinyl acetate can vary between 1% to 8%, the concentration of the surfactant such as t-octylphenoxypolyethoxyethanol can vary between 0.1 to 3% and the concentration of the preservative can be varied from 0.25% to 1%. It will be understood that all weights are on a completely non-volatile basis. The remaining ingredients can be varied as well to some degree above and below the concentrations listed in the tables below.

Examples of joint compound formulae incorporating any or all of the above ingredients are shown in the following tables (Examples 1–10):

| Ingredients | Weight % |
|---|---|
| EXAMPLE 1 | |
| Gypsum | 59.22 |
| Talc | 4.00 |
| Antifoam | 0.06 |
| Biocide | 0.06 |
| Cellulose | 0.66 |
| Polyvinyl Acetate | 2.67 |
| Surfactant | 0.10 |
| Water | 33.23 |
| EXAMPLE 2 | |
| Gypsum | 6.03 |
| Talc | 2.00 |
| Antifoam | 0.06 |
| Biocide | 0.06 |
| Cellulose | 0.83 |
| Polyvinyl Acetate | 2.68 |
| Surfactant | 0.10 |
| Water | 33.24 |
| EXAMPLE 3 | |
| Gypsum | 59.7 |
| Perlite | 3.33 |
| Antifoam | 0.06 |
| Biocide | 0.06 |
| Cellulose | 0.83 |
| Polyvinyl Acetate | 2.66 |
| Surfactant | 0.5 |
| Water | 33.21 |
| EXAMPLE 4 | |
| Gypsum | 56.36 |
| Wollastinite | 6.66 |
| Antifoam | 0.06 |
| Biocide | 0.06 |
| Cellulose | 0.83 |
| Polyvinyl Acetate | 2.66 |
| Surfactant | 0.50 |
| Water | 32.87 |
| EXAMPLE 5 | |
| Gypsum | 54.86 |
| Wollastinite | 9.33 |
| Antifoam | 0.06 |
| Biocide | 0.06 |
| Colloidal Minerals | 0.33 |
| Polyvinyl Acetate | 2.00 |
| Surfactant | 0.20 |
| Water | 33.16 |
| EXAMPLE 6 | |
| Gypsum | 45.97 |
| Wollastinite | 8.75 |
| Antifoam | 0.06 |
| Biocide | 0.06 |
| Cellulose | 0.16 |
| Polyvinyl Acetate | 7.50 |
| Surfactant | 0.20 |
| Water | 37.30 |
| EXAMPLE 7 | |
| Gypsum | 48.38 |
| Wollastinite | 8.35 |
| Antifoam | 0.06 |
| Biocide | 0.06 |
| Cellulose | 0.15 |
| Polyvinyl Acetate | 7.16 |
| Surfactant | 0.15 |
| Water | 35.69 |
| EXAMPLE 8 | |
| Gypsum | 51.3 |
| Perlite | 8.84 |
| Antifoam | 0.06 |
| Biocide | 0.06 |
| Cellulose | 0.16 |
| Polyvinyl Alcohol | 1.58 |
| Surfactant | 0.10 |
| Water | 37.90 |
| EXAMPLE 9 | |
| Gypsum | 50.11 |
| Perlite | 8.66 |
| Antifoam | 0.06 |

-continued

| Ingredients | Weight % |
|---|---|
| Biocide | 0.06 |
| Cellulose | 0.16 |
| Polyvinyl Alcohol | 0.77 |
| Polyvinyl Acetate | 3.09 |
| Surfactant | 0.30 |
| Water | 36.79 |
| EXAMPLE 10 | |
| Gypsum | 48.17 |
| Perlite | 8.32 |
| Antifoam | 0.06 |
| Biocide | 0.06 |
| Cellulose | 0.15 |
| Colloidal Minerals | 0.30 |
| Polyvinyl Alcohol | 0.74 |
| Polyvinyl Acetate | 2.97 |
| Surfactant | 0.10 |
| Water | 39.13 |

It will be understood that the above ingredients and the below process can also be employed to make a wall texture compound which is typically spread in a thin laminar fashion over an existing wallboard surface to provide a textured or other topographical features to a wall surface for decoration. Examples of wall texture compound formulae incorporating any or all of the above ingredients are shown in the following tables (Examples 11–13):

| Ingredients | Weight % |
|---|---|
| EXAMPLE 11 | |
| Gypsum | 44.27 |
| Perlite | 3.50 |
| Antifoam | 0.05 |
| Biocide | 0.05 |
| Cellulose | 0.125 |
| Polyvinyl Acetate | 2.00 |
| Surfactant | 0.10 |
| Water | 49.90 |
| EXAMPLE 12 | |
| Gypsum | 42.77 |
| Perlite | 5.00 |
| Antifoam | 0.05 |
| Biocide | 0.05 |
| Cellulose | 0.125 |
| Polyvinyl Acetate | 2.00 |
| Surfactant | 0.15 |
| Water | 49.85 |
| EXAMPLE 13 | |
| Gypsum | 42.56 |
| Perlite | 4.98 |
| Antifoam | 0.05 |
| Biocide | 0.05 |
| Cellulose | 0.12 |
| Polyvinyl Acetate | 4.98 |
| Surfactant | 0.15 |
| Water | 47.11 |

An important feature of this invention has been described as the inclusion of gypsum recycled from waste wallboard material. The following describes a system and a process which is effective in reconstituting gypsum filler from waste wallboard material. The process can be broken down into three broad steps: (1) separating the paper backing from the gypsum material; (2) baling the paper backing for recycling purposes; and (3) forming a joint compound mixture with the reclaimed gypsum material. The apparatus and method steps used in each of these systems are described below.

1. Separating the Paper Backing from the Wallboard Material

The paper backing must first be removed as completely as possible from, the wallboard material so that the residual paper content of the wallboard material is as low as possible. This portion of the process is referred to as the separation system and is shown generally at 10 in FIG. 1. Various components of the separation system 10 are shown in greater detail in FIGS. 2–7.

The separation system 10 comprises a hoist 12 adapted to deliver a quantity of waste wallboard material to a first conveyor 14 which, in turn, transports the waste wallboard material beneath a metal detector 16. A signal is generated by the metal detector 16 if the waste wallboard material contains more than a predetermined minimal amount of metal which deactivates the conveyor 14. Otherwise, the waste wallboard is delivered to a separator 18 which removes the paper backing from the wallboard material. The paper backing is delivered via a second conveyor 20 to a baling system, shown generally at 22. The reclaimed wallboard material is delivered via a third conveyor 24 to a mixing system, shown generally at 26.

Figure 2:
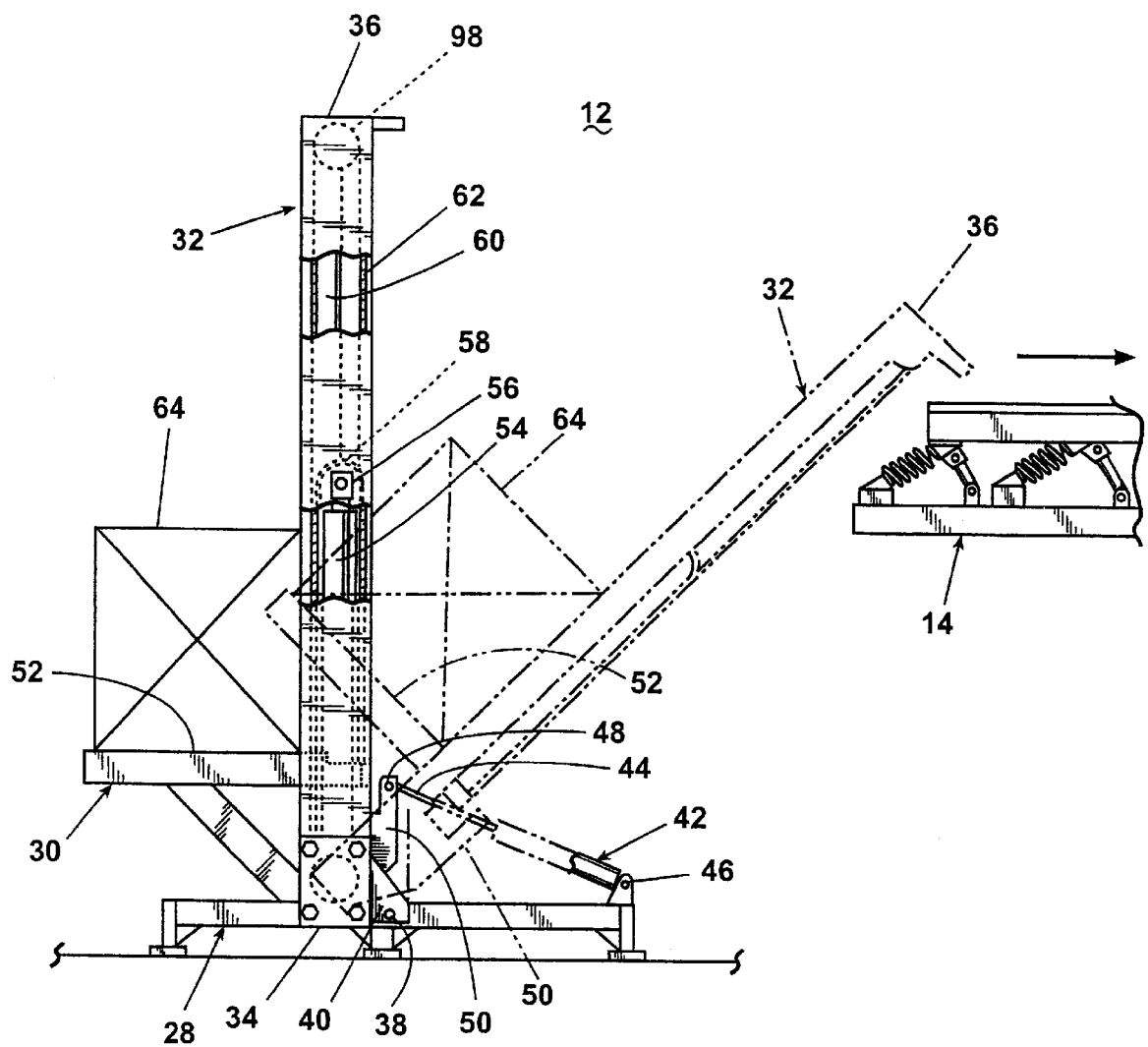
FIG. 2 is a side elevational view of an example of a hoist used in the system of FIG. 1, shown movable between a vertical position and a tilted position wherein the hoist can transport waste wallboard to a conveyor located adjacent thereto.

An example of a preferred embodiment of the hoist 12 is shown in FIG. 1 and in greater detail in FIG. 2. The hoist 12 comprises a base 28 and a lift arm 30 movably disposed on a column 32. The column 32 has a first end 34 and a second end 36. The first end 34 of the column 32 is pivotally mounted to the base 28 by a pin 38 which mounts within a flange 40 extending laterally on the first end 34. A cylinder 42 having a piston 44 extending axially has an end 46 mounted pivotally to the base 28. An end 48 of the piston 44 is mounted pivotally to a flange 50 of the column 32 adjacent to the first end 34 thereof. The lift arm 30 includes an upper surface 52 thereon for receiving a quantity of wallboard material, shown in phantom outline at 64.

The lift arm 30 can be moved along the longitudinal length of the column 32 between the first and second ends 34 and 36 by means of a cylinder 54 having an axially-extendable piston 56 therein. The lift arm 30 is moved with respect to the base 28 by a leaf chain 62 having one end mounted to the base 28, a second end mounted to the lift arm 32 with an intermediate portion wrapped over the piston 56. The lift arm 30 can be provided with a roller 58 which rides within a track 60 on the column 32 to constrain the movement of the lift arm 30 with respect to the column 32 to longitudinal movement.

Actuation of the cylinder 42 moves the piston 44 axially with respect thereto which, in turn, tilts the column 32 with respect to the base 28 between a generally 30 vertical position (shown in solid line) and a tilted position (shown in phantom outline). In the tilted position, the second end 36 of the column 32 is positioned adjacent the second conveyor 14.

In operation, the waste wallboard 64 can be placed on the upper surface 52 of the lift arm 30 when the column 32 is positioned in the vertical position and the lift arm 30 is located adjacent to the first end 34 thereof. The cylinder 42 is actuated to position the lift arm 30 and the column 32 in the tilted position shown in FIG. 2. The cylinder 54 is actuated to urge the lift arm 30 to the second end 36 of the column 32.

It will be understood that a switching or sensing mechanism can be provided adjacent to the second end 36 of the column 32, so that movement of the lift arm 30 toward the second end 36 of the column 32 can be stopped to control the amount of waste wallboard which is delivered to the first conveyor 14. Preferably, once a top layer of wallboard begins to drop onto the first conveyor 14, movement of the lift arm 30 is stopped until the wallboard has been moved away from an area on the first conveyor 14 on which the hoist 12 delivers the waste wallboard material.

Once the drop area is clear, movement of the lift arm 30 continues toward the second end 36 to deliver additional waste wallboard to the first conveyor 14. Once the lift arm 30 is emptied, the cylinder 54 is retracted to return the lift arm 30 to the first end 34 of the column 32. The cylinder 42 is actuated to reposition the column 32 in a vertical position whereby the hoist 12 is ready to receive additional wallboard.

Although a tiltable hoist 12 is shown in FIG. 2, it will be understood that any conveying apparatus known in the art can be employed to deliver waste wallboard material to the second conveyor 14. Alternatively, the waste wallboard material can be placed directly onto the second conveyor 14 without requiring the use of a lifting mechanism such as the hoist 12.

Figure 3:
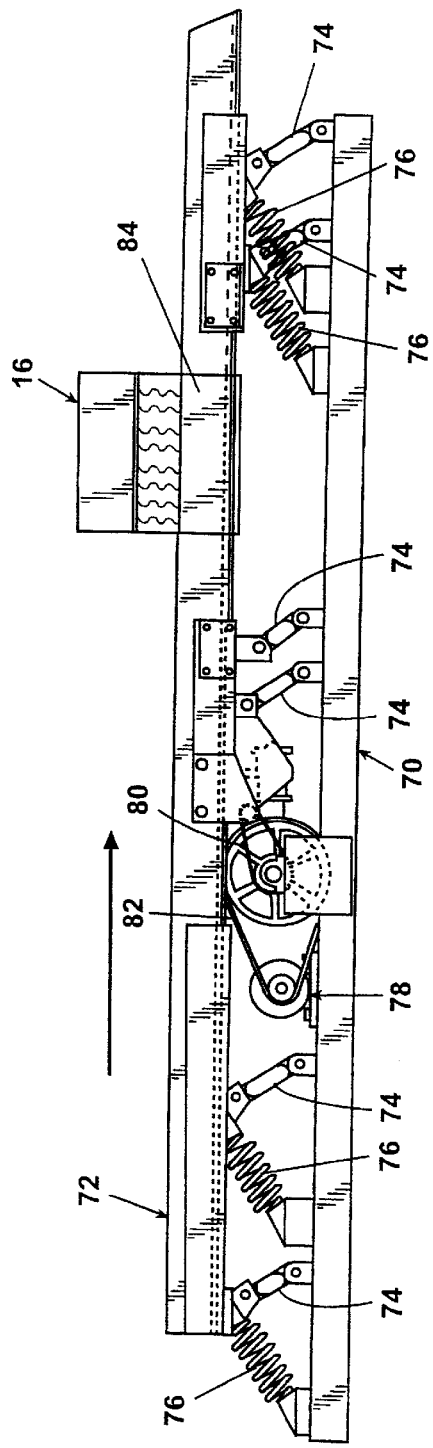
FIG. 3 is a side elevational view of a conveyor used in the system of FIG. 1.

An example of the first conveyor 14 is shown schematically in FIG. 1 and in greater detail in FIG. 3. It has been found that a conveying apparatus which produces desirable results for movement of waste wallboard pieces, often of varying shapes and sizes, is a vibratory conveyor such as the Vibra-Pro Conveyor, Model No. BHSR-540900FS-1/4(MS) 20'F-7.5HP, available from Vibra-Pro Company, Inc., P.O. Box 9227, Boise, Id., 83707. It will be understood that, although a vibratory conveyor is disclosed herein as the preferred embodiment, any known transporting and handling device can be used, such as roller conveyors or push-rod conveyors, without departing from the scope of this invention.

Vibratory conveyors, also called feeders, generally comprise a fixed base 70 which supports a bed 72 via several links 74 mounted pivotally at a first angle with respect to the base 70. Several springs 76 are mounted to the base 70 and the bed 72. at a second angle with respect to the base 70. A motor 78 is mounted to the base 70, which is interconnected to an eccentric drive 80 via an endless belt 82. Actuation of the motor 78 causes the eccentric drive 80 to oscillate the bed 72 with respect to the base 70 generally along an axis parallel with the longitudinal axes of the springs 76 so that waste wallboard material is moved along the length of the bed 72.

Vibratory conveyors such as the first conveyor 14 are based upon the principle of natural frequency. In this design, the natural frequency of the first conveyor 14 depends upon the ratio of the weight of the material vibrating upon the bed 72 and the number of springs 76 installed which determine the speed at which the material is transported. Natural frequency is generally defined as the energy required to initially compress or extend each individual spring 76 and then release the spring 76 to a static condition. The compression and extension of the first conveyor 14 causes the conveyor itself to vibrate in an oscillatory fashion, causing the wallboard to move in one direction at a rate dependent on the oscillatory frequency. The frequency of the conveyor 14 can be selected by varying these parameters to select a preferable speed at which the waste wallboard material is transported.

The metal detector 16 is mounted adjacent to the first conveyor 14, preferably upstream of the separator 18 as shown in FIG. 1 and centered over the bed 72. It has also been found that the inadvertent detection of any metal portions of the first conveyor 14 can be successfully attenuated by providing the bed 72 of the first conveyor 14 with a non-metal portion 84 located beneath the metal detector 16 as shown in FIG. 2. The non-metallic portion 84 can be made of a material such as fiberglass or resin so that small pieces of metal in the waste wallboard material can be successfully detected.

The metal detector 16 can be operatively interconnected with the hoist 12, the first conveyor 14 and the separator 18, so that when metal in the waste wallboard material is located by the metal detector 16, one or more of these components can be deactivated until an operator can find the piece of metal and remove it therefrom. Once the metal has been removed, the operator can restart the deactivated components. Successful detection and removal of metal fragments in the waste wallboard material is important for successful operation and prevention of damage to components downstream of the metal detector 16 in this system.

Figure 4:
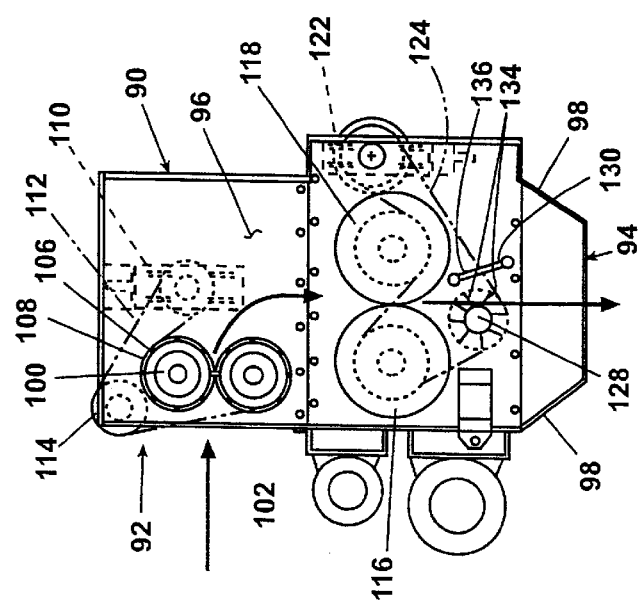
FIG. 4 is a side elevational view of a sizer and separator used in the system of FIG. 1 for removing a paper backing from wallboard waste.
Figure 5:
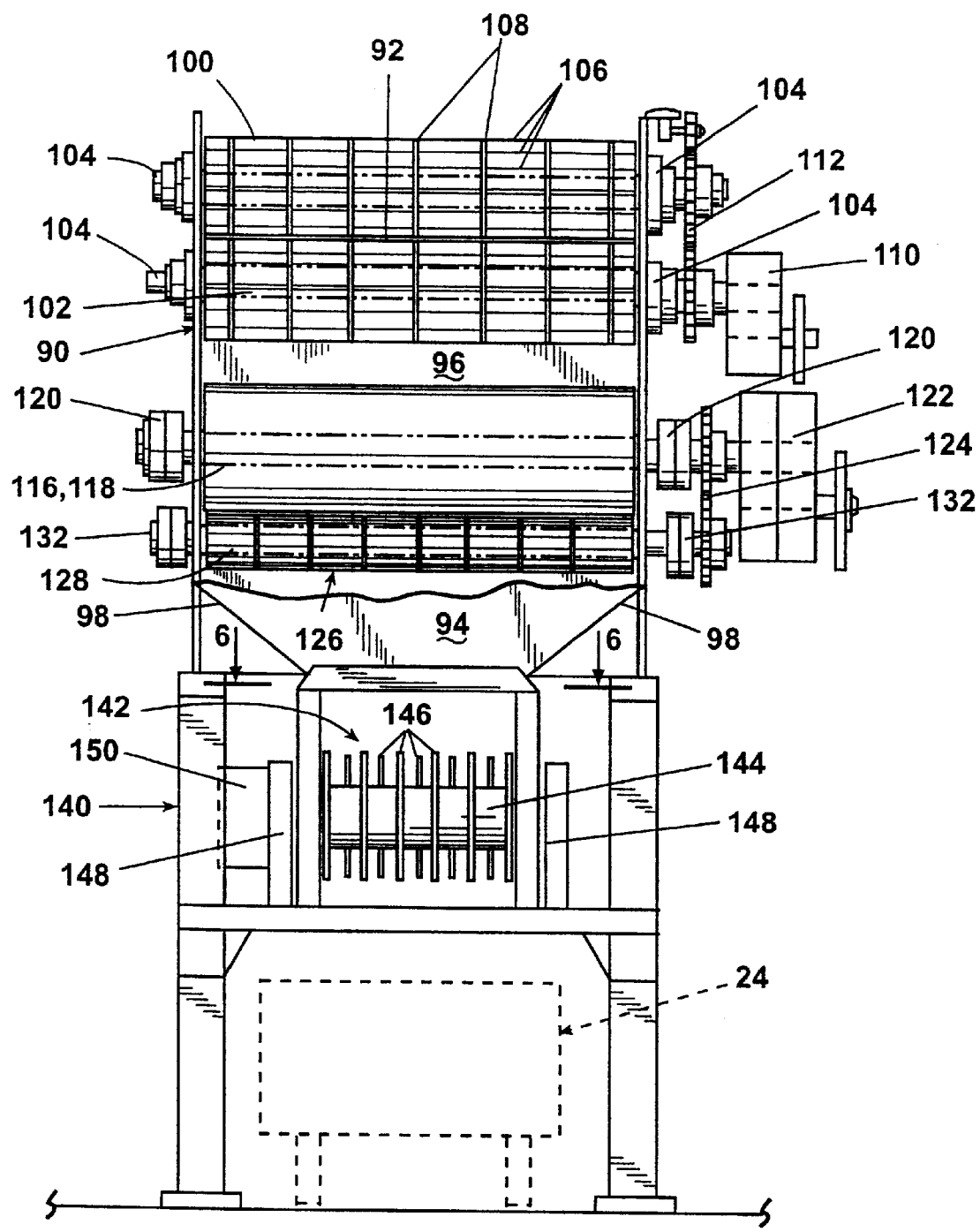
FIG. 5 is a front elevational view of the sizer and separator of FIG. 4 and a conveyor which receives material exiting the separator.

The separator 18 is shown schematically in FIG. 1 and in greater detail in FIGS. 4–5. The separator is an improvement over the apparatus disclosed in commonly-assigned U.S. Pat. No. 5,100,063 to Bauer, entitled "Recovery of Components of Waste Plasterboard", issued Mar. 31, 1992, and incorporated herein by reference.

The separator 18 generally comprises a housing 90 which has an inlet port 92, an outlet port 94 and a conduit 96 interconnecting the ports 92 and 94. The inlet port 92 is adapted to receive waste wallboard material delivered thereto by the first conveyor 14. The outlet port 94 can be provided with a tapering wall 98 which is adapted to funnel material exiting the separator 18 to the second and third conveyors 20 and 24, respectively.

An upper portion of the conduit 96 adjacent to the inlet port 92 is provided with a first pair of counterrotating rollers 100 and 102. Each end of the rollers 100 and 102 are journaled within bearings 104 provided on opposing walls of the housing 90. An outer surface of each of the rollers 100 and 102 is provided with several longitudinally spaced blades 106 and several spaced circumferential blades 108 each of which are preferably perpendicularly aligned at a predetermined common distance thereon. It has been found that spacing the blades 106 and 108 a distance of less than two feet apart, and preferably in the range of 8 to 12 inches apart, provides desirable results. The blades 106 and 108 are preferably mounted to the rollers 100 and 102 so as to be removable for easy replacement as needed. It has been found that reducing the size of the incoming wallboard material, such as by the action of the rollers 100 and 102 thereagainst, ensures a uniform flow of the wallboard material downstream of the separator 18.

A conventional motor 110 is provided on the housing, which is interconnected with the first pair of rollers 100 and 102 via an endless belt 112. A slack roller 114 can be provided intermediate between the motor 110 and the rollers 100 and 102 to maintain tension in the belt 112 typically by means of a spring (not shown) which biases the slack roller 114 against tension inherent in the belt 112. Alternatively, the motor 110 can be interconnected with the rollers 100 and 102 by any conventional means, such as gear teeth on a motor shaft which are interengaged with teeth on one or both of the rollers 100 and 102.

In operation, the material fed by the first conveyor 14 is provided to the separator 18. The material passes between the pair of first rollers 100 and 102 whereby the blades 106 and 108 located on the rollers 100 and 102 score a "checkerboard" pattern into the wallboard material. The material is fed between the rollers 100 and 102 due to the counterrotation of the rollers 100 and 102 provided by the motor 110.

A pair of second counterrotating rollers 116 and 118 are provided within the conduit 96 beneath the pair of first rollers 100 and 102 so that material exiting between the first rollers 100 and 102 falls by gravity toward the pair of second rollers 116 and 118. Each of the second rollers 116 and 118 are journaled within bearings 120 provided on opposing walls of the housing 90. An outer surface of each of the rollers 116 and 118 has a smooth cylindrical surface thereon to keep any paper passing therethrough from being torn or pinched.

A conventional motor 122 is provided on the housing, which is interconnected with the pair of second rollers 116 and 118 via an endless belt 124. Alternatively, the motor 122 can be interconnected with the second rollers 116 and 118 by any conventional means, such as a chain or gear teeth on a motor shaft which are interengaged with teeth on one or both of the second rollers 116 and 118. The counterrotating action of the second rollers 116 and 118 act to draw any material exiting the first rollers 100 and 102 therebetween. The wallboard material (gypsum) is crushed between the second rollers 116 and 118 which causes the crushed wallboard material to fall therebeneath. The paper backing which was mounted to a rear surface of the wallboard material is left virtually intact and is pulled between the rollers 116 and 118 as a result of the counterrotating action thereof.

A lump breaking assembly 126 is provided immediately beneath the second rollers 116 and 118 which comprises aroller 128 and a stator 130. The roller 128 comprises a cylindrical body which is journaled in bearings 132 on opposing lateral walls of the housing 90. Preferably, the roller 128 has an outer diameter which is smaller than an outer diameter of the rollers 116 and 118. The roller 128 of the lump breaking assembly 126 also preferably has several fins 134 welded thereto in a longitudinal orientation with respect to the roller 128. As shown in FIG. 4, the roller 128 is preferably interconnected with the same drive mechanism interconnecting the rollers 116 and 118 with the motor 122. The stator 130 comprises a plate 136 mounted and fixed to the housing 90 wherein one end of the plate 136 is positioned adjacent an exit of the rollers 116 and 118 and an opposite end extends tangentially with respect to the roller 128 of the lump breaking assembly 126.

In operation, the lump breaking assembly 126 reduces the size of any unduly large pieces of wallboard material exiting between the second rollers 116 and 118, The rods 134 bear the large pieces against the stator 130 in order to further reduce the wallboard pieces. The crushed wallboard material and the removed paper backing fall by gravity out of the outlet port 94 and onto the second conveyor 20.

Figure 6:
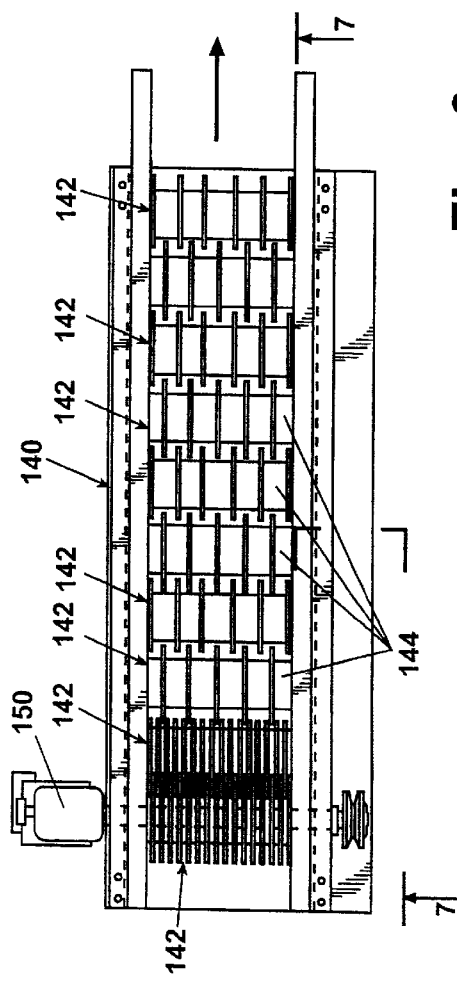
FIG. 6 is a top plan view of the conveyor of FIG. 5 used in the wallboard recycling system of FIG. 1.
Figure 7:
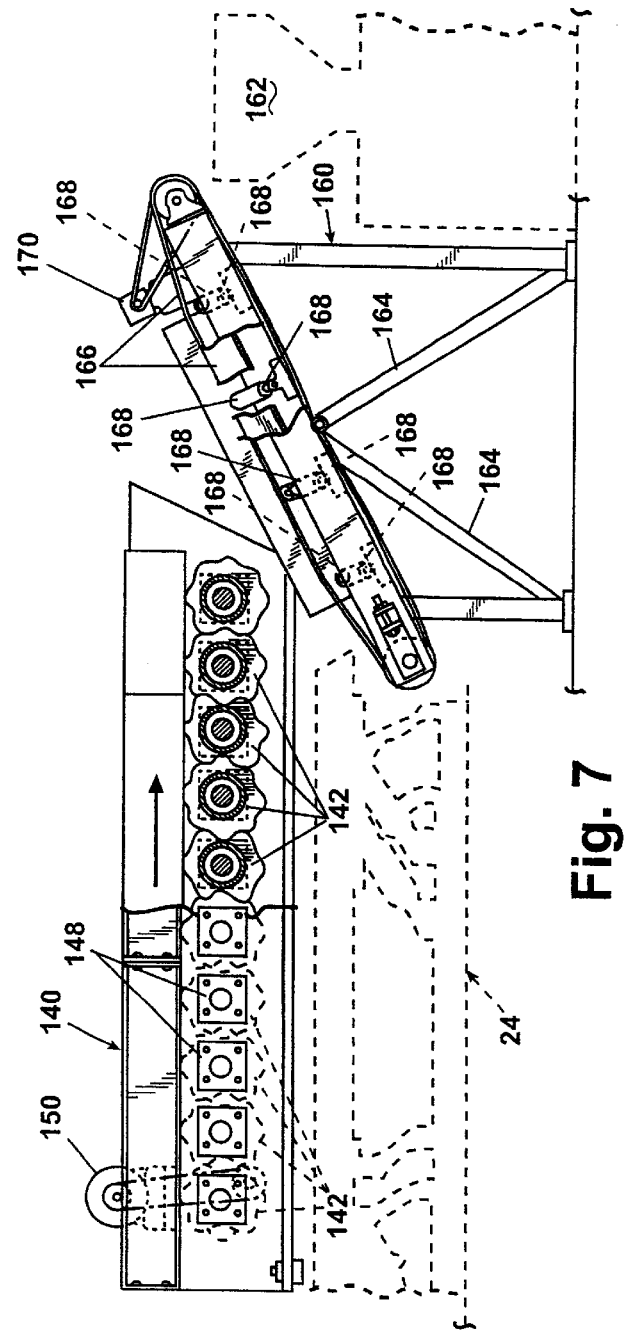
FIG. 7 is a side elevational of the conveyor of FIG. 6 adjacent to a tilted conveyor used to transport material exiting the conveyor of FIGS. 5–6 to a bin shown in phantom outline.

As shown in FIGS. 5–7, the second conveyor 20 receives the crushed wallboard material and the packing backing therefor from the separator 18 and transports only the paper backing to the baling system 22 while passing the crushed wallboard to the third conveyor 24. It has been found that a Model 24-10 Heavy-duty Design Disc Scalping Conveyor, available from West Salem Machinery, 665 Murlark Avenue N.W., Salem, Oreg., 97304, provides excellent results in separating the crushed wallboard from the paper backing. The second conveyor 20 comprises a housing 140 having several spaced rotor assemblies 142 thereon. Each rotor assembly 142 comprises an elongated shaft 144 provided with several semi-circular discs 146 mounted thereto, with successive discs 146 mounted in an alternating arrangement around the circumference of the shaft 144. Each of the rotor assemblies 142 are journaled within bearings 148 on opposing walls of the housing 140.

A motor 150 is provided on the housing 140 which is interconnected with at least one rotor assembly 142 and the remaining rotor assemblies are interconnected with gear teeth 152 so that actuation of the motor 150 rotates all of the rotor assemblies 142 in unison. Two rotor assemblies adjacent to the separator are provided with a tight interface therebetween so that a minimum of material falls between the rotor assemblies 142. The remaining rotor assemblies 142 have alternating orientation of the discs 146 thereon so that rotation of the rotor assemblies 142 creates a wave-like motion toward the baling system 22. The remaining rotor assemblies 142 also define gaps 154 therebetween so that crushed wallboard material falls through the gaps 154 while the paper backing remains atop the rotor assemblies 142 and is carried toward the baling system 22. Any wallboard material resting atop the paper backing is vibrated or rolled off of the paper backing and falls between the gaps 154.

As shown in FIG. 7, the third conveyor 24 is mounted beneath the second conveyor 20 for collecting any crushed wallboard material which falls between the gaps 154 in the second conveyor 20. It will be understood that the third conveyor 24 has a configuration similar to that described for the first conveyor 14 shown in FIG. 3. The third conveyor 24 further comprises a meshed screen provided on the bed of the third conveyor which effectively sifts out any paper backing and oversized pieces of crushed wallboard which may have been inadvertently dropped by the second conveyor 20 onto the third conveyor 24. The oversized pieces are sent to the baling system 22. The pieces passing through the mesh screen are collected and sent to the mixing system 26 as described below. The mesh screen preferably comprises a perforated plate having several spaced apertures therein. It has been found that apertures in the range of one-half inch to one inch, and preferably three-quarters of an inch, produce desirable sifting results. The perforated plate preferably has dimensions selected to allow for sufficient retention time of the wallboard and paper backing to be thoroughly separated.

2. Baling the Paper Backing for Disposal and/or Recycling

Figure 8:
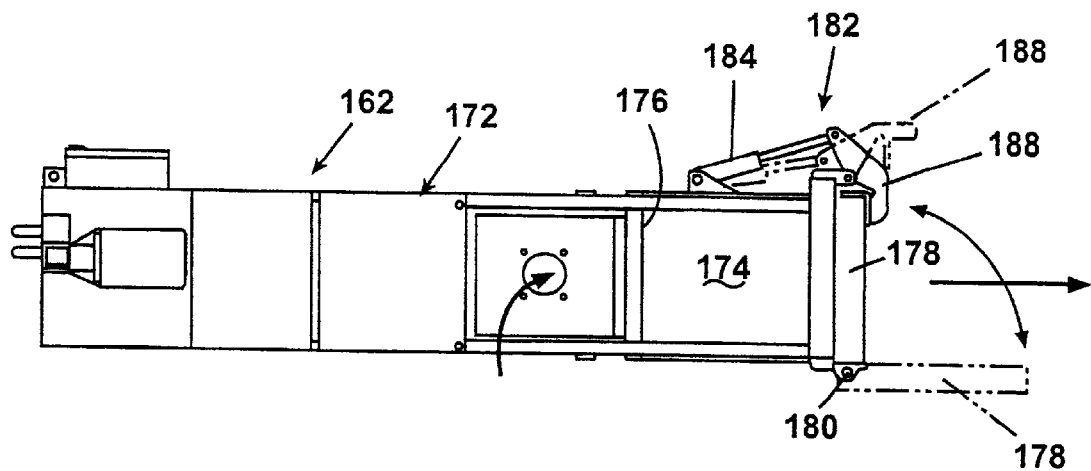
FIG. 8 is a top plan view of a baler used in the system of FIG. 1.

The baling system 22 is shown in FIG. 1 and in greater detail in FIG. 8. The function of the baling system is to collect the paper backing which was removed from the wallboard waste material in the separator 18 and carried on the second and third conveyors 20 and 24, respectively, and package the collected paper backing material for convenient disposal or recycling.

The baling system 22 comprises a hoist 160 and a baler 162. The hoist 160 collects the paper backing material exiting from ends of the second and third conveyors 20 and 24 and transports the collected material into the baler 162.

As shown in FIG. 8, the hoist 160 can comprise an angled conveyor having a base 164 which supports a belt 166 supported on casters 168 and is driven by a motor 170. The baler 162 is located adjacent an upper end of the hoist 160 whereby materials carried on the belt 166 thereof are passed into the baler 162 as they pass over the upper edge thereof.

The baler 162 comprises a housing 172 defining a baling chamber 174 which is open at an upper end. A hydraulic ram 176 is located at one end of the baling chamber 174. An opposite end of the chamber 174 is provided with a movable door 178 attached to a wall of the baling chamber 174 by hinges 180. A locking mechanism 182 comprising a cylinder 184 pivotally mounted to the housing 172 having an axially extending piston 186. The piston 186 has a claw 188 adapted to engage an end of the door 178 and retain it in a closed position. When the claw 188 is released from engagement with the locking mechanism 182, the door 178 can pivot about the hinges 180 to the open position allowing access to the baling chamber 174 in a lateral direction.

The paper backing material that has been removed from the wallboard material is delivered to the hoist 160 by the second and third conveyors 20 and 24. The paper backing material rides on the belt 166 of the hoist 160 and is dispensed into the baling chamber 174 through the open upper end thereof. Of note, the door 178 is normally positioned in the closed position and retained therein by the locking mechanism, 182. The paper backing material is collected in the baling chamber 174 until it reaches a predetermined height as detected by a sensor, such as a photoelectric eye, limit switch, weight sensor or the like, at which point the hydraulic ram 176 is actuated. The ram 176 pushes the paper backing material collected within the baling chamber 174 against the closed door 178. The ram 176 is then retracted which allows for additional paper backing material to be accumulated in the baling chamber 174.

After a sufficient amount of paper backing material has been compressed against the door 178 by the ram 176, a pressure sensor measures a predetermined level of pressure which the ram requires to compress the paper backing material. The ram 176 is maintained against the compressed paper backing material against the door 178. The baler 162 either automatically, or at an operator's discretion, places wire around the compressed paper backing material in a tightly wound fashion. The locking mechanism 182 is released and the door 178 is opened automatically. The baled paper backing material is then ejected on to a pallet or roll case where it can be removed with a forklift or other suitable vehicle.

3. Forming the Joint Compound Material with Reclaimed Gypsum

The mixing system 26 is shown schematically in FIG. 1 and various components thereof are shown in greater detail in FIGS. 9–14. The function of the mixing system 26 is to collect and feed the reclaimed wallboard material after the paper backing has been removed to a mixing station. Remaining ingredients of the joint compound are added in appropriate proportions and provided to a filling station for dispensing the joint compound material into individual packages.

Figure 9:
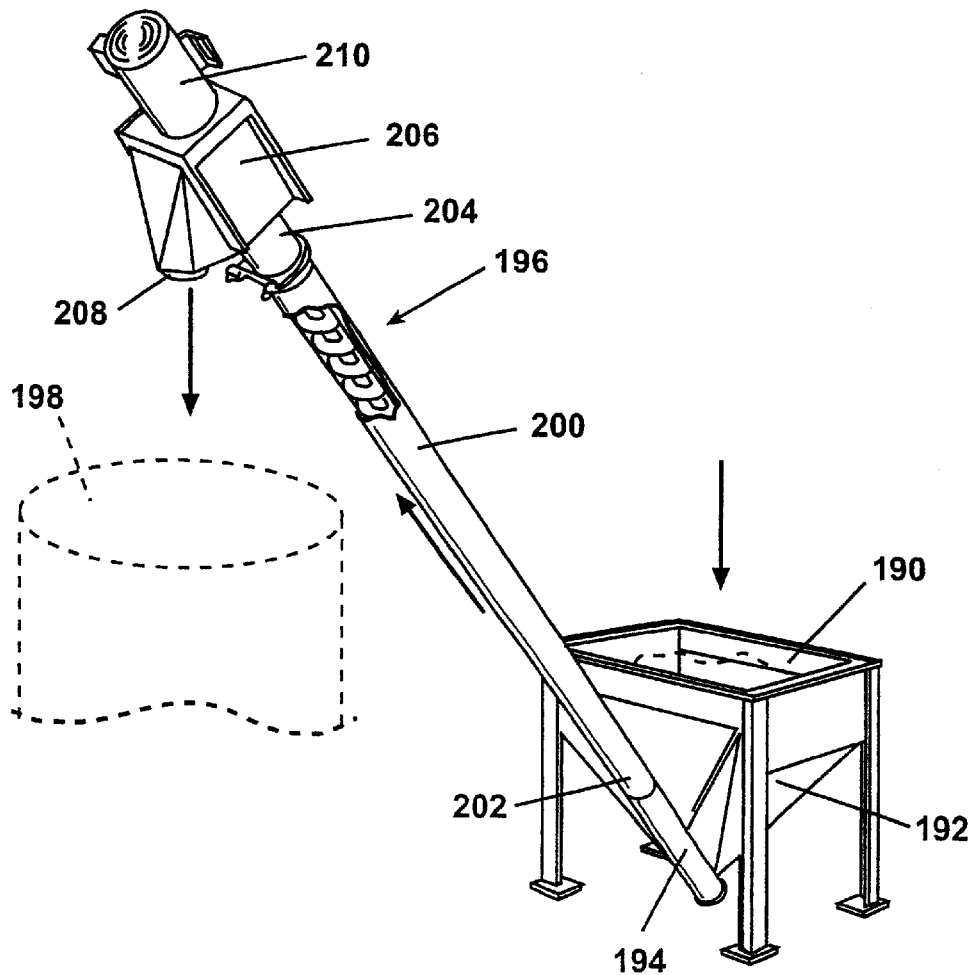
FIG. 9 is a perspective view of a conveying apparatus comprising a helical auger interconnected at one end to a first bin and adapted to transport material from the separator of FIG. 4 to a milling and collection apparatus of FIG. 10 shown here in phantom outline.

As shown schematically in FIG. 1 and in greater detail in FIG. 9, a bin 190 having a tapering base 192 is provided beneath the second and third conveyors 20 and 24 which collects the crushed wallboard material therefrom. The base 192 has an upwardly extending sleeve 194 thereon which communicates with the interior of the bin 190. A conveyor 196 is provided adjacent to the bin 190 for transporting crushed wallboard material accumulated in the bin 190 toward a secondary storage facility 198.

As shown in FIG. 9, it has been found that a Hapman Helix Screw Conveyor Model No. X06828AA, available from Hapman, Inc., 6002 E. Kilgore Road, P.O. Box 2321, Kalamazoo, Mich., 49003, provides excellent material handling result. It will be understood that any known handling apparatus for transporting small pieces of material can be used without departing from the scope of this invention. The conveyor 196 generally comprises an elongated cylindrical housing 200 having a first end 202 mounted coaxially to the sleeve 194 and a second end 204 mounted to a second housing 206 having a downwardly-facing outlet port 208 which is aligned with the secondary storage facility 198. A motor 210 is provided on the second housing 206 which rotates a helical auger 212 disposed coaxially within the elongated housing 200 so that a distal end (not shown) thereof is positioned within the sleeve 194 of the bin 190.

In operation, the wallboard material falls into the bin 190 whereby a small section of the auger 212 is exposed to grab the material and transport it along the housing 200. When the wallboard material reaches the second end 204, it is passed through the outlet port 208 into the secondary storage facility. The auger 208 preferably has no center shaft so that it is flexible thereby also preventing collection of the wallboard material thereon which tends to reduce flow through the conveyor 196.

The secondary storage facility 198 preferably can store a large volume of wallboard material in the range of more than ten thousand pounds thereof. Broadly defined, the volume of the secondary storage facility is preferably sufficient to contain the wallboard production for a predetermined period of time so that the separating system 10 and/or the baling system 22 can be shut down without stopping the mixing system 26. This operational capability increases the efficiency of the system and ensures that no portion of the system is reliant upon the operation of the others.

As shown in FIG. 1, an additional conveyor 214 is interconnected with a base portion of the secondary storage facility 198 and an inlet port of a mill 216. It has been found that a conveyor 214, configured similarly as the conveyor, 196 provides desirable results.

The mill 216 is provided to reduce the size of the wallboard material into a granular form. Preferably, the mill 216 can reduce the incoming wallboard material to a granular size of 325 mesh or smaller. It has been found that an Air Purge Classifier Mill, Model No. APCM 200, available from Blue Tech, Inc., P.O. Box 2674, Hickory, N.C., 28603-2674, is able to grind the incoming wallboard material into a granular state having satisfactory mesh size. It will be understood that the conveyor 214 delivers the wallboard material to the mill 216 through an inlet port 218 thereof. A surge hopper 220 comprising a bin 222 having a tapered base 224 can be provided upstream of the inlet port 218 whereby a valve 226 can divert the flow of material from the conveyor 214 into the hopper 220 to prevent an over-accumulation of material in the mill 216.

Figure 10:
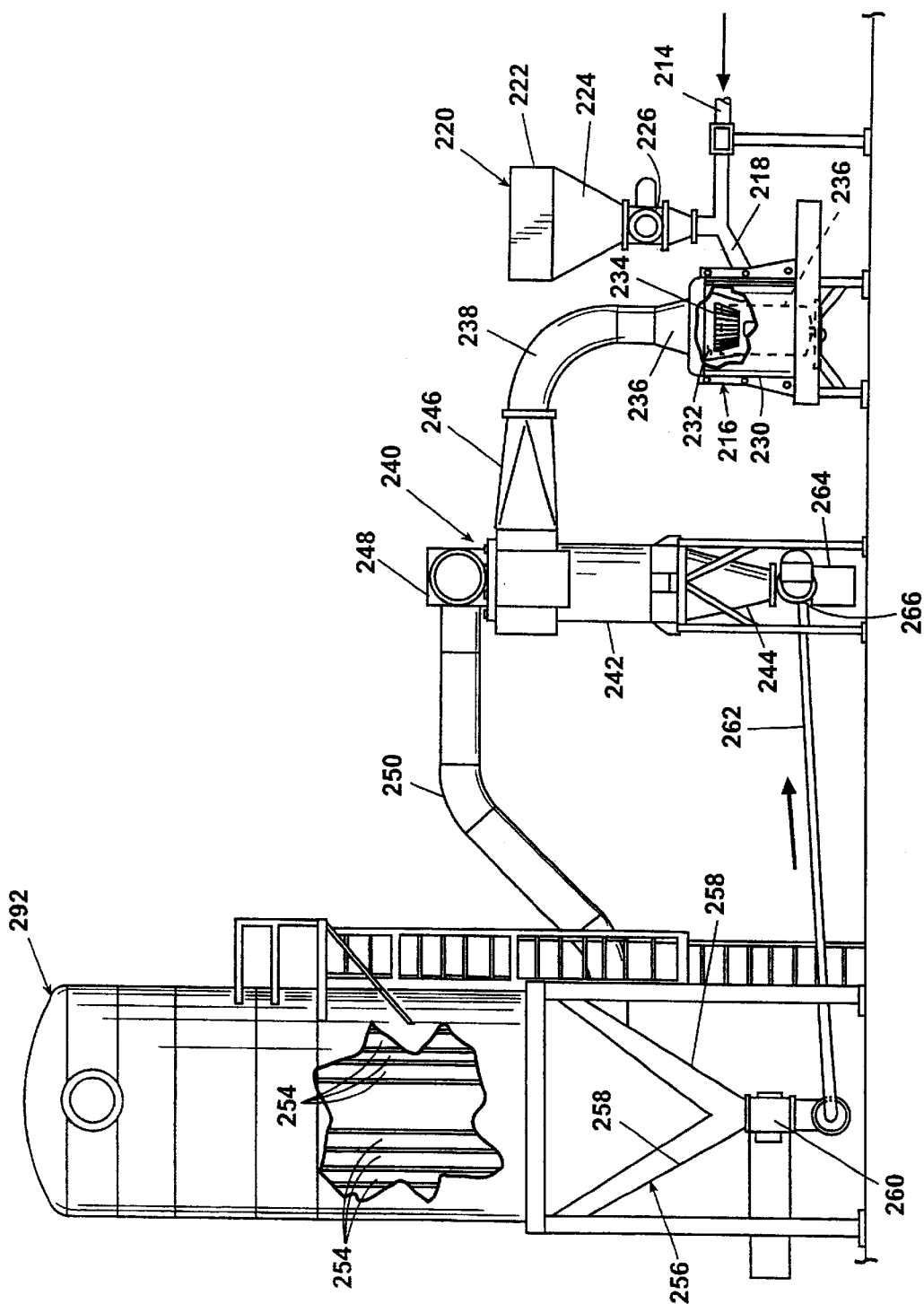
FIG. 10 is a side elevational view of an example of the milling and collection apparatus used in the system of FIG. 1.

As shown in FIG. 10, the mill 216 comprises a housing 230 which cooperates with the inlet port 218 to receive the wallboard material within an interior chamber 232 thereof. The interior chamber 232 is provided with a rotating blade 234 which is interconnected with a motor 236 whereby actuation of the motor 236 rotates the blade 234 and grinds the incoming wallboard material within the chamber 232.

As the wallboard particles decrease in size as a result of the action of the blade 234, the wallboard particles are deflected inwardly by an air-dispersing ring (not shown) causing particles of a predetermined minimum mesh size to be drawn upwardly through an exhaust port 236. These particles are then carried through a conduit 238 to a collector apparatus 240. Oversized particles are entrained within an internal air stream formed in the mill 216 and returned to engagement with the blade 234 for additional grinding to a smaller mesh size. The mill 216 can also be provided with a controller (not shown) which periodically schedules a "purge cycle" which dumps the contents of the interior chamber 232 of the mill 216 into an adjacent receptacle (not shown). Any oversized material not ground to the preselected mesh size is then cleared from the mill 216. Typically, these oversized materials comprise trace materials such as silica sand and dolomite. The purge cycle is therefore effective in reducing the concentration of these trace contaminants whereby they are held in the mill 216 until cleaned by a purge cycle.

The collector apparatus 240 is also shown in FIG. 10 and comprises a cylindrical housing 242 having a conical base 244. An inlet port 246 communicates with an upper portion of the interior of the housing 242 whereby a spiral-type motion is created within the housing 242. The spiral motion of the wallboard material, now granular following its exit from the mill 216, facilitates the removal of air from the wallboard granules, thus increasing density and allowing the material to be weighed as described below. The granules are directed along the tapering wall 244 of the housing 240 and collect at a base thereof where they are stored at a high density following the air removal.

Any wallboard granules remaining airborne within the housing 242 are allowed to exit through an outlet port 248 located at the top of the housing 242 and travel through a conduit 250 to a dust collector 252. Preferably, the vast majority of wallboard granules fall to the base of the housing 244 and only a small fraction are removed to the dust collector 252.

The dust collector 252 includes several coaxial filter members 254 therein and a blower (not shown) which pulls any airborne wallboard granules out of the mill 216 and into the collector 252. The blower maintains several pounds of static pressure required to "pull" the wallboard granules from the mill 216. An advantage to this type of milling is that, as soon as the gypsum reaches the pre-selected mesh size, the blower instantly pulls the granules away from the mill 216. This action minimizes the creation of fines as well as preventing the temperature of the wallboard granules from rising. A minimal temperature rise is an important feature in maintaining the integrity of the wallboard granules. The dust collector 252 is designed to receive the preferably low percentage of fine wallboard granules that escape from the collector apparatus 240. The wallboard granules collect on the filter members 254 and any air is passed therethrough. A quick pulse of back-pressure is applied which cleans the filter members 254 by forcing air through the filter in reverse. This ejects the collected wallboard granules from the filter members 254 and into a bin 256 having tapering walls 258 located at the base of the collector 252. The wallboard granules are then metered through a rotary air lock 260 and transported though a conveyor 262, such as the screw auger shown in FIG. 9, to the base of the collector 240. The lost wallboard granules therein are rejoined with the wallboard granules collected at the base 244 of the housing 242. This introduces the lost wallboard granules back into the production stream, thus completing a closed loop system.

As shown schematically in FIG. 1 and in greater detail in FIG. 11, an elevator 264 is provided adjacent the base 244 of the housing 242 of the collector 240 whereby discrete volumes of wallboard granules are dispensed through a rotary air lock 266 at the base 244. It has been found that the Bucket Elevator/Lowerator Model No. BES-12P-SW-SD, available from Deamco Corp., 6520 East Washington Blvd., City of Commerce, Calif., 90040-1822, provides excellent results. It will be understood that the elevator 264 is provided as a means to save floor space for the various components of this system and any appropriate conveying apparatus can be used.

The purpose of the elevator 264 is to move the wallboard granules from one processing location to another at a relatively high speed, thus transporting at least 15,000 pounds per hour. The example elevator 264 of FIG. 10 comprises an elongated vertical housing 268 having laterally extending lower and upper portions 270 and 272, respectively. A series of interconnected buckets 274 are disposed within an internal conduit 276 defined by the housing 268 and lateral portions 270 and 272. A motor 278 is provided on the housing 268 for transporting the buckets 274 along an internal track (not shown) within the housing 268 so that each bucket 274 traverses the conduit 276 from the lower portion 270, upwardly along the housing 268 and laterally along the upper portion 272. Upon reaching a distal end 280 of the upper portion 272, each bucket 274 is overturned onto a flow control bin 282 through an outlet port 284 defined in a lower surface 286 thereof.

The wallboard granules are metered into successive buckets 274 of the elevator 264 through the rotary air lock 266. The elevator 264 preferably imparts only a gentle motion to the wallboard granules in the buckets 274 because, after wallboard granules have been milled, they become hygroscopic and/or electrically charged and tend to stick to surfaces. Thus, conventional methods of conveyance are often undesirable. As a result, the elevator 264 preferably gently carries the wallboard granules to the outlet port 284. At the outlet port 284, each bucket 274 is rotated 180 degrees. The wallboard granules fall out into the flow control bin 282. A knocking bar (not shown) can be provided adjacent to the outlet port 284 in the upper portion 272 which is struck by each bucket 274 as they pass. Any granules remaining on the sides of each bucket 274 are knocked free and also fall into the bin 282 which prevents accumulation of granules in the buckets 274 and prevents waste as well. Although the interior of the elevator 264 is shown in FIG. 10, the housing 268 preferably fully encloses the interior thereof to prevent dust from escaping into the environment.

It is also contemplated that the bin 282 could have a "bulk" outlet port (not shown) for enabling the packaging of milled wallboard granules (such as powdered gypsum) into bulk bags as desired. Alternatively, the bin 282 has an outlet port 288 for dispensing the collected wallboard granules into a feeder 290 as shown in FIG. 12.

Elevators such as that shown in FIG. 11 often cause small voids within a volume of wallboard granules, therefore, the bin 282 is preferably of the "flow control" type which causes granular material to be packed as tightly as gravity will allow within the bin 282. It has been found that a Model 501-70 flow control bin available from Wheatland Bins Ltd., 3125-24th Ave. North, Lethbridge, AB T1H 5G2 (Country???), produces desirable results. For example, the Wheatland bin has sides disposed at steep angles, such as 70 degrees, and several pads made from a low friction material such as Solimar to help maintain product flow through the bin 282 onto the feeder 290. Level sensors (not shown) can be provided at spaced intervals within the bin 282 to monitor the wallboard granule level in the bin 282. One or more of the sensors can be operationally interconnected with the airlock 260 of the collector 240 or the airlock 226 which controls the volume of granular material supplied from the bin 220 to the mill 216. The feeder 290 is located adjacent to the base of the bin 282 allowing for constant flow of material therethrough with little or no fluctuation in weight.

The feeder 290 comprises an apparatus which can transport discrete weight volumes of material from one location to another. It has been found that the K-Tron Weight Belt Feeder Model No. W600, available from K-Tron North America, Routes 55 & 553, Pitman, N.J., 08071, is designed for this type of function. The feeder 290, as shown by example in FIG. 12, uses a belt 292 driven by a motor 294 across a weight bridge 296 to move the wallboard granules from point to point while weighing the material simultaneously. The feeder 290 has an inlet port 298 which is aligned with the outlet port 288 of the bin 282.

The feeder 290 is preferably designed to maintain a programmed feed rate which can be entered by the user or controller therefor. The belt 292 on the feeder 290 changes speed to maintain the given feed rate for a particular weight of material per unit time. By controlling the flow of the material to a predetermined weight feed rate, the feeder 290 maintains a high level of quality. The feeder 290 preferably meters the material to a blending unit 300 (see FIG. 12) at a rate appropriate for the mixing system 26. Once a given weight of material is collected on the belt 292, the belt 292 is advanced by the motor 294, so that the desired weight of material is passed onto the blending unit 300.

As shown in FIG. 12, a sleeve 302 is provided between the blending unit 300 and the feeder 290 which guides the reclaimed wallboard material into the blending unit 300 to allow for minimal pre-mixing of a combination of dry chemicals and the wallboard material. The dry chemicals to be mixed with the wallboard material can include perlite or related material, methylcellulose and any other materials required to be mixed with the wallboard granules.

As shown schematically in FIGS. 1 and 13, the ingredients are provided in storage tanks adjacent to the blending unit 300. It will be understood that additional or fewer ingredients can be supplied to the blending unit 300 without departing from the scope of this invention. As shown in FIG. 13, ingredients such as an antifoaming agent, biocide, water, polymer, surfactant and perlite or synthetic equivalent thereof, can be provided in storage tanks 304, 306, 308, 310 and 312, respectively, and each has a feeding mechanism 314, 316, 318, 320, and 322, respectively, interconnected with the blending unit 300 by conduits 324, 326, 328, 330 and 332, respectively.

A controller 344 can be interconnected to the feeding mechanisms 314, 316, 318, 320 and 322 via connections 334, 336, 338, 340 and 342, respectively to provide metering and dispensing instructions thereto as well as to receive feedback from the feeding mechanisms 314–322 to maintain high accuracy and precision for feeding the materials in tanks 304–312. The controller 344 can include algorithm instructions for controlling the feeding mechanisms 314–322 of the tanks 304–312 to control the exact volume of material passing through each feeding mechanism 314–322. The controller 344 thereby eliminates the need for meters, isolation valves, flow control valves, and additional piping, although these components can be employed without departing from the scope of the invention.

It will be understood that the tanks 304–312 which contain the various ingredients can be supplied by the manufacturer in a stock bulk tank, preferably in a large volume, which is mounted to the corresponding feeding mechanism 314–322 or the conduit 324–332 via conventional quick connections. Alternatively, the tanks 304–312 can be supplied with filling stations (not shown in the schematic of FIG. 13) whereby the tanks 304–312 can be filled with the appropriate compound(s) as needed.

For liquid ingredients, it has been found that the feeding mechanisms 314–322 preferably include a precise metering system to provide an accurate quantity of a particular ingredient to the blending unit 300. It has been found that a Viking Spur Gear Single Pump, SG Series, available from Viking Pump, Inc., Cedar Falls, Iowa, 50613, provides desirable metering characteristics. The feeding mechanisms 314–322 preferably operates via a pair of closely aligned counterrotating gears which create a pressure differential between a feed side and an exit side of the pump causing the liquid to be pulled therethrough.

Alternatively, for solid ingredients, it has been found that the feeding mechanisms 314–322 also preferably include a precise metering system to dispense the solid material, usually in granular form, into the blending unit 300. A loss-in-weight feeder, such as the Twin-Screw K2-Modular Feeder, Model No. K2MLT20, available from K-Tron North America, Routes 55 & 553, Pitman, N.J., 08071, provides excellent feeding characteristics. The loss-in-weight feeder typically includes a discharge unit interconnected with a main hopper. A refill hopper can also be used to stage the perlite before it is poured through a gate valve into the main hopper. The discharge unit preferably includes a twin auger assembly contained in a tubular case which is attached to an electric motor to drive the augers in one direction to move the product contained therein into the corresponding conduit 324–332.

It will also be understood that the feeding mechanism 314–322 for solid ingredients can be mounted upon a weighing system whereby, as the material is discharged, the weight difference per unit of time is continually measured and compared to a predetermined value. The discharge speed of the feeding mechanism can be varied to adjust for changes in density of the material and available volume. When the hopper content reaches a minimum level, the hopper is either automatically refilled from the refill hopper or an operator is signaled to add additional material to the tank 304–312. This type of metering system is very accurate for solid ingredients because any changes in feed rate are computed in real-time with respect to weight changes in the material being fed.

The sleeve 302, which extends from the feeder 290 and the conduits 324–332 of the tanks 304–312 extend into an inlet port 346 of the blending unit 300 as shown in FIG. 13. Alternatively, one or more of the conduits 324–332 can be interconnected with the sleeve 302 to provide a degree of pre-mixing of the ingredients of the joint compound.

The blending unit 300 further comprises a housing 348 which journals at least one shaft 350 within bearings 352 located on opposing longitudinal ends of the housing 348. The shaft 350 is provided with several paddles 354 extending radially therefrom, which are disposed continuously around a circumference of and along the longitudinal length thereof. The paddles 354 are preferably configured and angled to provide an optimum mixing of a combination of solid and liquid ingredients. The paddles 354 can have their pitch adjusted to control the speed at which the mixture moves along the interior of the housing 348. Accordingly the time that the mixture spends in the interior of the housing 348 can be controlled. An outlet port 356 is provided at the opposite end of the housing 348 from the inlet port 346. Although a blending unit 300 having one shaft is shown in the drawings, any configuration for a blending unit, including one having multiple shafts, can be employed without departing from the scope of this invention.

The blending unit 300 is preferably an in-line continuous blender as opposed to a batch-type mixer, although either type of mixer can be used without departing from the scope of this invention. The in-line continuous blender allows the system to be continually blending the ingredients while a batch-type mixer generally comprises a fixed-volume tank in which discrete volumes of ingredients are mixed wherein the tank must be emptied of the mixture before additional mixing can be done. An example of an excellent blending unit is an Agitator Mixer, DA- or DAK-Series, available from Hayes & Stolz Industrial Manufacturing Co., P.O. Box 11217, Fort Worth, Tex.

It will be understood that, although all of the conduits 324–332 are shown interconnected with the inlet port 346 of the blending unit 300, the ingredients can be added upstream of the blending unit 300 or anywhere along the longitudinal length of the housing 348 to control the time at which a particular ingredient is added to the mixture. In addition, it is preferable to add liquid ingredients into a lateral side of the blending unit 300 at a specified point so that a pliable or liquid mixture cannot collect in a feed tube such as the sleeve 302 or at the inlet portion of the blending unit 300 which can cause obstructions.

The blending unit is preferably driven by a variable speed motor 358 having an appropriate horsepower rating pre-selected so that the speed of the shaft 350 can be controlled to avoid over/under-blending and/or over/under-shearing the mixture.

A pump 360 is fluidly interconnected with the outlet port 356 which is adapted to be mounted directly to the bottom of the blending unit 300 and can pump the mixture, which can be heavy and viscous, from the blending unit 300 to a downstream packaging system 400. It has been found that a Heavy-Duty Pump, Series 127 and 4127, available from Viking Pump, Inc., Cedar Falls, Iowa, 50613, provides desirable fluid transport results. The pump 360 preferably pulls the mixture from within the housing 348 of the blending unit 300 and pushes it through a line 362 to the packaging system 400. The pump is also preferably capable of maintaining a predetermined amount of pressure in the line 362 to insure that the mixture is delivered to the packaging system at a consistent flow rate and pressure.

A viscometer 364 is located along the line 362 between the blending unit 300 and the packaging system 400 which measures the relative viscosity of the mixture in the line. This value is critical to ensure the continuous operation of the system and to ensure that the mixture is within product specifications. A signal proportional to the viscosity of the mixture is sent via connection 366 to the controller 344 which, in turn, uses this signal to make minor adjustments to the amount of various ingredients added to the mixture in the blending unit 300 e.g., the amount of water, A temperature thermocouple 368 is also provided on the line 362, which sends a signal through connection 370 to the controller 344 proportional to the temperature of the mixture in the line 362. The temperature measurement is needed not only to quantify any changes in viscosity at certain temperatures, but also to monitor the conditions of the blending unit 300 and the pump 360. If either the pump 360 or the blending unit 300 are cavitating or creating friction in the mixture then the temperature will increase. The controller 344 can thereby adjust the other system components to accommodate the temperature changes or deactivate the system to allow an alert condition to be remedied.

As previously described, the mixture in the line 362 is delivered to the packaging system 400 which comprises a case erector 402, a case preparation apparatus 404, a filling station 406 and a case sealer 408. The packaging system 400 is designed to package, seal and prepare a quantity of the joint compound for delivery to the customer.

The case erector 402 includes a quantity of cases, such as cardboard carton blanks, which can be supplied in a magazine and fed individually therefrom. Each of the cases can be erected by a known apparatus, such as the Model PBI-AT32 case erector, available from K & R Equipment, Inc., 1110 North Seventh Street, San Jose, Calif., 95112, which provides desirable results. In addition, the case preparation apparatus 404 is provided which lines the erected case with a plastic liner. The liner is typically unwound from a supply roll and inserted into the case with a known air evacuation system. The liner is cuffed over extended upper flaps of each case by the case preparation apparatus 404 and is conveyed toward the filling station 406.

Figure 14:
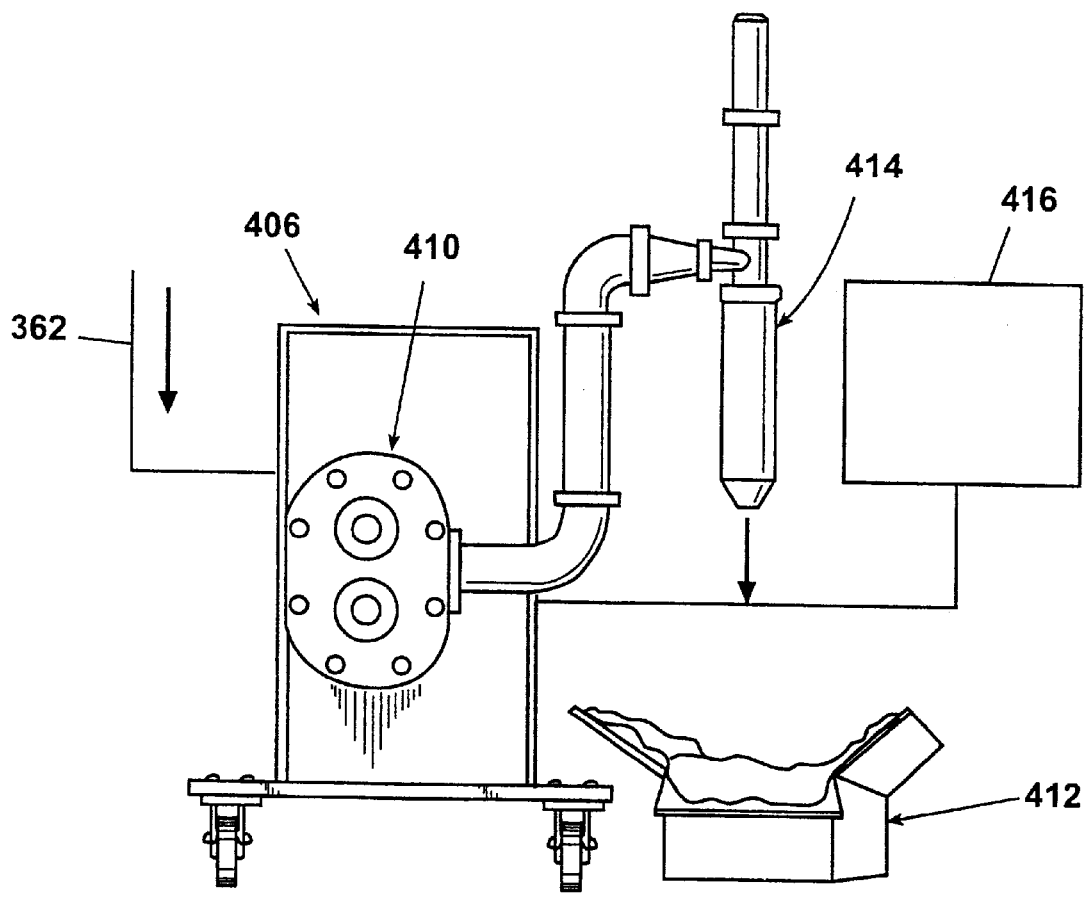
FIG. 14 is a side elevational view of a material-dispensing apparatus of the system shown in FIG. 1 for dispensing the joint composition material exiting the blending unit of FIG. 13 into a package for convenient transportation and shipping.

As shown in FIG. 14, the filling station 406 preferably comprises an automated positive displacement filling apparatus such as that manufactured by Oden Corporation of Buffalo, N.Y. and known as a Pro/Fill 6000. In operation, a pump feeds the mixture from the line 362 to an in-feed of the filling station. The mixture is fed to a filling pump 410 under a pre-selected pressure and flow rate sufficient to assure an adequate supply of mixture to avoid cavitation or starvation of the filling pump 410. Filling of an erected and lined case 412 is accomplished volumetrically by a servomotor (not shown) used to rotate the pump 410. The pump 410 is provided with an encoder, which defines a volumetric dose based upon an increment of pulses from the encoder to a pre-set electronic counter.

The product is dispensed into cases 412 with liners that have been inserted by the case preparation apparatus 404. The cases 412 are placed upon a conveyor and subsequently indexed into position under a positive shut-off filling nozzle 414 provided for dispensing of product at each filling position. A controller 416 is used to control and integrate the automated functions of the packaging system. After cases 412 are indexed into a filling position beneath the nozzle 414, they remain stationary while the nozzle 414 dispenses the mixture therein. Upon delivery of the correct amount of product into the case 412, the case 412 is discharged from the filling station 406 to a case sealer 408 wherein the liner within the case 412 is sealed around the mixture in the case 412. Following the sealing of the case 412, the case 412 is further indexed to a taping unit wherein excess air between the liner and the mixture is removed, any flaps on the case 412 are folded around the sealed liner and pressure-sensitive tape is applied to seal the case 412. Cases 412 can then be accumulated on a pallet where they can be shrink-wrapped and prepared for a mass shipment.

While the invention has been specifically described in connection with certain specific embodiments thereof, it is to be understood that this by way of illustration and not limitation, and the scope of the appended claims should be construed as broadly as the prior art will permit.

What is claimed is:

1. A method for producing a joint compound composition suitable for insertion within a seam between adjacent wallboard panels comprising the steps of:

providing a waste wallboard panel having a predominantly gypsum core and a paper backing;

separating the paper backing from the gypsum core, while at the same time reducing the gypsum core to a collection of gypsum pieces, at least some of the pieces being larger than a predetermined mesh size;

sorting the separated paper backing from the separated collection of gypsum pieces;

continuously milling only the separated collection of gypsum pieces larger than the predetermined mesh size in a milling chamber while, at the same time, removing the gypsum pieces milled to a size smaller than the predetermined mesh size from the milling chamber; and mixing the removed gypsum pieces smaller than the predetermined mesh size with at least one of a binder, a preservative and a rheological additive to form a flowable joint compound mixture with a desirable smooth consistency.

2. The method of claim 1 and further comprising the step of baling the separated paper backing into a compressed package.

3. The method of claim 2 wherein the step of separating the paper backing from the gypsum core further comprises the steps of:

providing a metal detector;
actuating the metal detector to sense residual metal components remaining in the separated gypsum core; and
alerting a user of the presence of metal components remaining in the waste wallboard panel.

4. The method of claim 3 and further comprising the step of providing at least one secondary storage facility for intermediate storage of removed gypsum pieces prior to the step of mixing the removed gypsum pieces with said at least one of a binder, a preservative and a rheological additive.

5. The method of claim 1 wherein the step of reclaiming the filler constituent from waste wallboard panel further comprises the steps of:
providing a metal detector;
actuating the metal detector to sense residual metal components remaining in the separated gypsum core; and
alerting a user of the presence of metal components remaining in the separated gypsum core.

6. The method of claim 1 and further comprising the step of providing at least one secondary storage facility for intermediate storage of the removed gypsum pieces prior to the step of mixing the removed gypsum pieces with said at least one of a binder, a preservative and a rheological additive.

7. The method of claim 1 and further comprising the step of periodically purging the milling chamber to reduce any trace contaminants therein.

8. The method of claim 7 and further comprising the step of collecting the removed gypsum pieces from the milling chamber in at least one secondary storage facility.

9. The method of claim 1 and further comprising the step of providing a mixing unit for mixing the removed gypsum pieces with at least one of the binder, preservative and rheological additive.

10. The method of claim 9 and further comprising the step of fluidly interconnecting the mixing unit with a supply of the binder.

11. The method of claim 10 and further comprising the step of fluidly interconnecting the mixing unit with a supply of the preservative.

12. The method of claim 11 and further comprising the step of fluidly interconnecting the mixing unit with a supply of the rheological additive.

13. The method of claim 12 and further comprising the step of metering a predetermined amount of the removed gypsum pieces into the mixing unit.

14. The method of claim 13 and further comprising the step of metering a predetermined amount of the binder into the mixing unit.

15. The method of claim 14 and further comprising the step of metering a predetermined amount of the preservative into the mixing unit.

16. The method of claim 15 and further comprising the step of metering a predetermined amount of the rheological additive into the mixing unit.

17. The method of claim 16 and further comprising the step of actuating the mixing unit to mix the removed gypsum pieces, the binder, the preservative, and the rheological additive into a joint compound mixture.

18. The method of claim 9 and further comprising the step of fluidly interconnecting the mixing unit with a supply of the preservative.

19. The method of claim 9 and further comprising the step of fluidly interconnecting the mixing unit with a supply of the rheological additive.

20. The method of claim 9 and further comprising the step of metering a predetermined amount of the removed gypsum pieces into the mixing unit.

21. The method of claim 9 and further comprising the step of metering a predetermined amount of the binder into the mixing unit.

22. The method of claim 9 and further comprising the step of metering a predetermined amount of the preservative into the mixing unit.

23. The method of claim 9 and further comprising the step of metering a predetermined amount of the rheological additive into the mixing unit.

24. The method of claim 9 and further comprising the step of actuating the mixing unit to mix the removed gypsum pieces, the binder, the preservative, and the rheological additive into a joint compound mixture.

25. The method of claim 9 and further comprising the step of providing the mixing unit with at least one shaft having radially-extending blades thereon.

26. The method of claim 9 and further comprising the steps of:
providing an outlet port on the mixing unit;
providing a packaging system downstream of the mixing unit; and
fluidly interconnecting the outlet port of the mixing unit to the packaging system.

27. The method of claim 26 and further comprising the step of providing a pump intermediate the outlet port of the mixing unit and the packaging system for controlling the flow of the joint compound mixture from the mixing unit to the packaging system by way of the outlet port of the mixing unit.

28. The method of claim 27, wherein the joint compound mixture has an undetermined viscosity, and further comprising the step of providing a viscometer fluidly interconnected between the mixing unit and the packaging system for indicating the viscosity of the joint compound mixture.

29. The method of claim 28 and further comprising the step of alerting a user when the viscosity of the joint compound mixture reaches a predetermined value.

30. The method of claim 29, wherein the joint compound mixture has an undetermined temperature, and further comprising the step of providing a thermometer fluidly interconnected between the mixing unit and the packaging system for indicating the temperature of the joint compound mixture.

31. The method of claim 26, wherein the joint compound mixture has an undetermined viscosity, and further comprising the step of providing a viscometer fluidly interconnected between the mixing unit and the packaging system for indicating the viscosity of the joint compound mixture.

32. The method of claim 31 and further comprising the step of alerting a user when the viscosity of the joint compound mixture reaches a predetermined value.

33. The method of claim 26, wherein the joint compound mixture has an undetermined temperature, and further comprising the step of providing a thermometer fluidly interconnected between the mixing unit and the packaging system for indicating the temperature of the joint compound mixture.

34. The method of claim 33 and further comprising the step of alerting a user when the temperature of the joint compound mixture reaches a predetermined value.

35. The method of claim 26 wherein the packaging system comprises a carton feeding apparatus and a filling station interconnected to the mixing unit.

36. The method of claim 35 and further comprising the step of positioning a carton adjacent to the filling station.

37. The method of claim 36 and further comprising the step of actuating the filling station to dispense a predetermined volume of the joint compound mixture into the carton.

38. The method of claim 37 and further comprising the step of closing and sealing the carton containing the predetermined volume of the joint compound mixture.

39. A method for producing a joint compound composition suitable for insertion within a seam between adjacent wallboard panels comprising the steps of:
- providing a waste wallboard panel having a predominantly gypsum core and paper backing;
- separating the paper backing from the gypsum core;
- reclaiming a filler constituent from the gypsum core;
- providing a metal detector;
- actuating the metal detector to sense residual metal components remaining in the gypsum core;
- mixing the filler constituent with at least one of a binder, a preservative and a rheological additive; and
- alerting a user of the presence of metal components remaining in the gypsum core.

40. A method for producing a joint compound composition suitable for insertion within a seam between adjacent wallboard panels comprising the steps of:
- providing a waste wallboard panel having a predominantly gypsum core and paper backing;
- separating the paper backing from the gypsum core;
- reclaiming a filler constituent from the gypsum core;
- providing a mixing unit;
- mixing the filler constituent in the mixing unit with at least one of a binder, a preservative and a rheological additive to form a joint compound mixture;
- providing an outlet port on the mixing unit;
- providing a packaging system downstream of the mixing unit;
- fluidly interconnecting the outlet port of the mixing unit to the packaging system; and
- providing a pump intermediate the outlet port of the mixing unit and the packaging system for controlling the flow of the joint compound mixture from the mixing unit to the packaging system.

41. The method of claim 40, wherein the joint compound mixture has an undetermined viscosity, and further comprising the step of providing a viscometer fluidly interconnected between the mixing unit and the packaging system for indicating the viscosity of the joint compound mixture.

42. The method of claim 41 and further comprising the step of alerting a user when the viscosity of the joint compound mixture reaches a predetermined value.

43. The method of claim 42 and further comprising the step of providing a thermometer fluidly interconnected between the mixing unit and the packaging system for indicating the temperature of the joint compound mixture.

44. A method for producing a joint compound composition suitable for insertion within a seam between adjacent wallboard panels comprising the steps of:
- providing a waste wallboard panel having a predominantly gypsum core and paper backing;
- separating the paper backing from the gypsum core;
- reclaiming a filler constituent from the gypsum core;
- providing a mixing unit;
- mixing the filler constituent in the mixing unit with at least one of a binder, a preservative and a rheological additive to form a joint compound mixture having an undetermined viscosity;
- providing an outlet port on the mixing unit;
- providing a packaging system downstream of the mixing unit;
- fluidly interconnecting the outlet port of the mixing unit to the packaging system; and
- providing a viscometer fluidly interconnected between the mixing unit and the packaging system for indicating the viscosity of the joint compound mixture.

45. The method of claim 44 and further comprising the step of alerting a user when the viscosity of the joint compound mixture reaches a predetermined value.

46. A method for producing a joint compound composition suitable for insertion within a seam between adjacent wallboard panels comprising the steps of:
- providing a waste wallboard panel having a predominantly gypsum core and paper backing;
- separating the paper backing from the gypsum core;
- reclaiming a filler constituent from the gypsum core;
- providing a mixing unit;
- mixing the filler constituent in the mixing unit with at least one of a binder, a preservative and a rheological additive to form a joint compound mixture having an undetermined temperature;
- providing an outlet port on the mixing unit;
- providing a packaging system downstream of the mixing unit;
- fluidly interconnecting the outlet port of the mixing unit to the packaging system; and
- providing a thermometer fluidly interconnected between the mixing unit and the packaging system for indicating the temperature of the joint compound mixture.

47. The method of claim 46 and further comprising the step of alerting a user when the temperature of the joint compound mixture reaches a predetermined value.

* * * * *